(12) United States Patent
Diamond

(10) Patent No.: US 8,657,203 B2
(45) Date of Patent: Feb. 25, 2014

(54) WIRELESS MOBILE COMMUNICATOR FOR CONTACTLESS PAYMENT ON ACCOUNT READ FROM REMOVABLE CARD

(75) Inventor: Stephen Diamond, Lafayette, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 13/358,339

(22) Filed: Jan. 25, 2012

(65) Prior Publication Data

US 2012/0118953 A1   May 17, 2012

Related U.S. Application Data

(63) Continuation of application No. 12/541,099, filed on Aug. 13, 2009, now Pat. No. 8,127,999.

(60) Provisional application No. 61/088,841, filed on Aug. 14, 2008.

(51) Int. Cl.
*G06K 19/06* (2006.01)
(52) U.S. Cl.
USPC .......................................... 235/492; 235/380
(58) Field of Classification Search
USPC ............ 235/492, 380, 375, 487, 449; 705/67, 705/72, 77, 42
See application file for complete search history.

(56) References Cited

U.S. PATENT DOCUMENTS

| | | | |
|---|---|---|---|
| 6,442,532 B1 | 8/2002 | Kawan | |
| 8,050,991 B2 | 11/2011 | Popovic et al. | |
| 8,341,029 B1 | 12/2012 | Ramalingam et al. | |
| 2003/0101134 A1* | 5/2003 | Liu et al. ......................... | 705/39 |
| 2004/0143527 A1* | 7/2004 | Benkert et al. .................. | 705/35 |
| 2004/0167820 A1 | 8/2004 | Melick | |
| 2004/0225617 A1* | 11/2004 | Baser et al. ..................... | 705/78 |
| 2005/0192896 A1* | 9/2005 | Hutchison et al. .............. | 705/40 |
| 2006/0004659 A1* | 1/2006 | Hutchison et al. .............. | 705/40 |
| 2006/0224470 A1 | 10/2006 | Garcia Ruano et al. | |
| 2007/0087822 A1* | 4/2007 | Van Luchene .................. | 463/25 |
| 2007/0288371 A1 | 12/2007 | Johnson | |
| 2008/0167961 A1 | 7/2008 | Wentker et al. | |
| 2008/0275779 A1* | 11/2008 | Lakshminarayanan ......... | 705/14 |
| 2008/0301055 A1* | 12/2008 | Borgs et al. ..................... | 705/64 |
| 2008/0308624 A1* | 12/2008 | Gardner ....................... | 235/380 |
| 2010/0088237 A1* | 4/2010 | Wankmueller .................. | 705/75 |
| 2012/0116902 A1* | 5/2012 | Cardina et al. .................. | 705/17 |

FOREIGN PATENT DOCUMENTS

| KR | 10-2004-0076555 | 1/2004 |
|---|---|---|
| KR | 10-2008-0050467 | 5/2008 |

* cited by examiner

*Primary Examiner* — Edwyn Labaze
(74) *Attorney, Agent, or Firm* — Loeb & Loeb LLP

(57) ABSTRACT

A wireless mobile communications apparatus reads removable cards and can communicate an account corresponding to the removable card in order to conduct a wireless transaction with a merchant on the account with the wireless mobile communications apparatus. A total currency amount for the transaction, and remaining balance in the account after the transaction, can be displayed on a display screen of the wireless mobile communications apparatus. The removable card can be a gift card bearing a magnetic strip having an identifier for the account encoded thereto that will be read when inserted into the wireless mobile communications apparatus which can be a cellular telephone or Web enabled portable device. The magnetic strip gift card can be substantially composed of paper so as to be intended for disposable after use.

22 Claims, 14 Drawing Sheets

WIRELESS MOBILE COMMUNICATOR FOR CONTACTLESS PAYMENT ON ACCOUNT READ FROM REMOVABLE CARD

CROSS-REFERENCE TO RELATED APPLICATIONS

This application is a continuation of and claims priority under 35 U.S.C. §120 from U.S. application Ser. No. 12/541,099 titled "Wireless Mobile Communicator For Contactless Payment On Account Read From Removable Card," filed on Aug. 13, 2009, which in turn claims priority to U.S. Provisional Application Ser. No. 61/088,841 titled "Open Loop Gift Card Loaded to Mobile Telephone to Support Mobile Payments," filed on Aug. 14, 2008, The entirety of the aforementioned applications are hereby incorporated by reference.

FIELD

The invention is related to a payment processing system in which a transaction between a merchant and a consumer is conducted on an account issued by an issuer, where the transaction is acquired from the merchant by an acquirer for collection on the account from the issuer through a transaction handler or transaction processor. The invention is more particularly related to a transaction on an account, and most particularly related to a contactless payment for a transaction on a gift card account using a wireless mobile communicator.

BACKGROUND

A gift card is a restricted monetary equivalent that is issued by issuers (e.g.; retailers or banks) to be used as an alternative to a non-monetary gift. A gift card may resemble a credit card or display a specific theme on a plastic card the size of a credit card. The card is identified by a specific number or code, not usually with an individual name, and thus could be used by anybody. Gift cards are backed by an on-line electronic system for authorization. Some gift cards can be reloaded by payment and can be used thus multiple times. A gift card may have a barcode or magnetic strip, which is read by an electronic credit card machine. Many gift cards have no value until they are sold, at which time an amount is input to a Point of Service terminal (POS) which the customer wishes to put into an account corresponding to the gift card. This amount is rarely stored on the card but is instead noted in the issuer's database, which is cross-linked to an identifier for the account corresponding to the card. Gift cards thus are generally not stored-value cards as used in many public transport systems or library photocopiers, where a simplified system (with no network) stores the value only on the card itself. To thwart counterfeiting, the data are encrypted. The magnetic strip can be placed differently than on traditional debit, prepaid, and credit cards, so they cannot be read or written with standard equipment. Other gift cards may have a set value and need to be activated by calling a specific number.

Gift cards are divided into "open loop" and "closed loop" cards. The former are issued by financial institutions (e.g.; banks) or payment card companies and can be redeemed by different establishments, the latter by a specific store or merchant and can be only redeemed by the issuing provider. The giver buys a gift card and the recipient of the gift card would use the value of the card, as reflected by a currency balance in a corresponding account issued by the issuer, in one or more later transactions. A third form is the "hybrid closed loop" card where the issuer has bundled a number of closed loop cards; an example is a gift card for a specific mall.

Gift cards differ from gift certificates, in that the latter are usually sold as a paper document with an authorized signature by a restaurant, store, or other individual establishment as a voucher for a future service; there is no electronic authorization. A gift certificate may or may not have an expiration date and generally has no administrative fees. Bank-issued gift cards may be used in lieu of checks as a way to disburse rebate funds.

For greater convenience of speed of commerce, consumer transactions with merchants are increasingly conducted by users of mobile computing devices, and particularly for conducting contactless transactions with merchants. In that gift cards are used as standalone portable consumer payment devices, it would be an advantage in the art to use a mobile computing device to conduct a transaction with a merchant on an account corresponding to a gift card.

SUMMARY

A wireless mobile communications apparatus reads removable cards having an identifier for an account encoded thereon. The identifier for the account can be communicated to a Point of Service terminal (POS) at which there is being conducted a wireless transaction with a merchant on the account by use of the wireless mobile communications apparatus. The POS communicates to the wireless mobile communications apparatus a total currency amount for the transaction, which can then be displayed on a display screen of the wireless mobile communications apparatus. A user of the wireless mobile communications apparatus can input data into the wireless mobile communications apparatus so as to indicate the user's approval of a withdrawal of the total currency from the account for the transaction. The approval is wirelessly communicated by the wireless mobile communications apparatus to the POS or other entity. The approval may include data (e.g., a password) to authenticate the user for use of the account to conduct the transaction. Upon completion of the transaction, data representing the remaining currency balance in the account after the transaction is wirelessly received by the wireless mobile communications apparatus from the POS or other entity. A representation of this balance can be rendered on the display screen of the wireless mobile communications apparatus. The removable card can be a gift card bearing a magnetic strip having an identifier for the account encoded thereto that will be read when inserted into the wireless mobile communications apparatus. The wireless mobile communications apparatus can be a cellular telephone or Web enabled portable wireless device or other mobile wireless communicator in the field of consumer electronics.

BRIEF DESCRIPTION OF THE DRAWINGS

The invention will become more apparent from the description set forth below when taken in conjunction with the drawings, in which like elements bear like reference numerals.

DESCRIPTION

Figure 1:
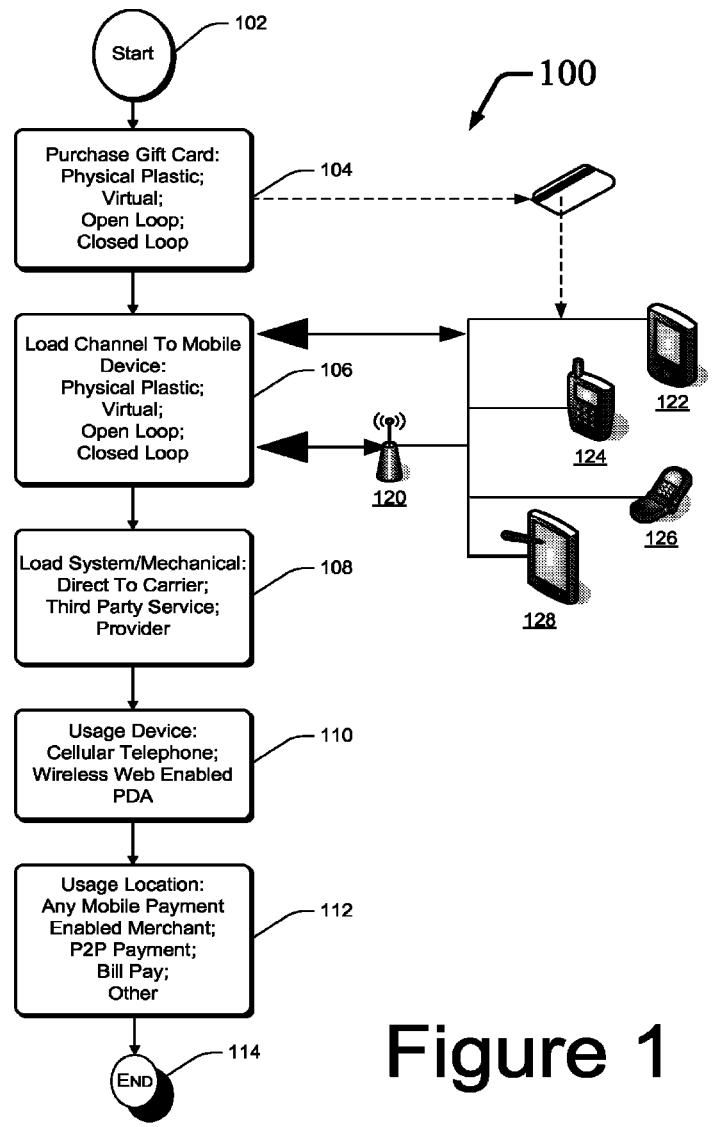
FIG. 1 is a flow chart of an exemplary process for associating an account of a gift card with a mobile device, and for thereafter using the mobile device to conducting transactions on the account with merchants.

In one implementation, a wireless mobile communications apparatus has a card reader configured to removably receive a data bearing card into a card installed position thereof. In this implementation, the data bearing card can be a gift card. The wireless mobile communications apparatus also has a display screen, an input device, wireless communications apparatus that can be used for wirelessly transreceiving of communications, and memory for storing instructions and data. The wireless mobile communications apparatus also has a computing apparatus. When the instructions in the memory are executed by the computing apparatus, and the card reader is in the installed position thereof, the card reader reads information encoded in the memory of the data bearing card, and other operations are performed as follows. An identifier for an account issued by an issuer is derived from the information encoded in the memory of the data bearing card. The wireless communications apparatus transmits the identifier for the account. Alternatively, a Point of Service terminal (POS) can wirelessly interrogate the wireless mobile communications apparatus to obtain from the identifier for the account from the removable card. In response to the transmission, the wireless communications apparatus receives a total currency amount of a transaction with a merchant being conducted on the account by use of the wireless mobile communications apparatus. A prompt requesting authorization withdrawal of the total currency amount for the transaction from the account is rendered on the display screen. The input device receives, in response to the rendered prompt, an indicator as to an approval of the requested authorization for the withdrawal of the total currency amount for the transaction from the account. A user of the wireless mobile communications apparatus can input data corresponding to the approval by use of the input device. The wireless communications apparatus is then used to transmit information corresponding to the indicator. The wireless communications apparatus receives, in response to the transmission of the information corresponding to the indicator, a remaining currency balance in the account, which is rendered on the display screen.

In the forgoing implementation, the card reader can be a magnetic strip card reader and the data bearing card can be a planar substrate having a surface with a magnetic strip. Alternatively, the card reader can be a bar code reader and the data bearing card can be a planar substrate with a surface having bar code thereon, where the information encoded in the memory of the data bearing card is encoded in the bar code. The wireless communications apparatus can include both short range communications apparatus and cellular telephony communications apparatus. The short range communications apparatus transmits the identifier for the account and the information corresponding to the indicator. The short range communications apparatus can be configured for communications in a range of less than about three hundred meters (e.g.; a communications protocol such as Near Field Communications (NFC), Bluetooth, wireless connectivity in a local area network (e.g.; Wi-Fi), IrDA, Radio-Frequency IDentification (RFID), a combination of these, etc.) The data bearing card can be a substrate that is substantially composed of paper or non-plastic card stock where the paper or non-plastic card stock has a surface on which is situated the memory of the data bearing card. For example, the data bearing card can have a form of an inexpensive, disposable magnetic strip substantially paper as is typical of a venue access ticket, such as a 'MetroCard' used by the Port Authority for public transit fares in the New York City area, a rider fare card used for the Washington Metropolitan Area Transmit Authority, the 'STIF' fare card used for public transportation access in the Paris, France 'Metro' subway, etc.

In yet other variations of the foregoing implementation: (i) the deriving of the identifier for the account issued by the issuer may include decrypting the encoded information read from the memory of the data bearing card to form the identifier for the account; (ii) the card reader may be further configured to encode information in the memory of the data bearing card, and the received remaining currency balance in the account can be encoded in the memory of the data bearing card. Input can be received from input device to reflect a user's demand to display the remaining currency balance in the account, which will be done by reading same from the memory and rendering same on the display screen; (iii) the data bearing card can be a gift card. As such, the card reader can be configured to removably receive the data bearing card in a form factor comprising a non-reloadable gift card for which the information encoded in the memory thereof does not include a currency amount or an identity of a user of the wireless mobile communications apparatus who is conducting the transaction on the account with the merchant. As such, neither the transmitting of the identifier for the account nor the transmitting of the information corresponding to the indicator includes a transmission of data corresponding to either a currency amount or an identifier for a cardholder of the gift card. Accordingly, in the case where the data bearing card is a gift card, the identity of the person using the gift card will not be known such that the transaction with the merchant on the account can be anonymous; and (iv) the indicator as to an approval of the requested authorization for the withdrawal of the total currency amount for the transaction from the account can be a password that is required for access to currency in the account. As such, the transmitting of the information corresponding to the indicator, as may be input by and known to an owner of the gift card, can include the transmission of the password. The transmitted password can be verified against the account by another entity (e.g., by the merchant, the merchant's acquirer, a transaction handler, the issuer of the account, and/or agents of the foregoing), before the transaction is permitted to proceed with being conducted on the account.

In another implementation, a cellular telephone ('cell phone') can have a magnetic strip card reader having a card installed position thereof and be configured for removably installing a planar substrate having a surface with a magnetic strip thereon into the card installed position of the magnetic strip card reader. In this implementation, the planar substrate having the surface with the magnetic strip can be a gift card. The cell phone can include a display screen, an input device (e.g., a key board, microphone, touch screen, etc.), a cellular telephony communications apparatus, a short range communications apparatus (e.g., apparatus for communications in a range of less than about 300 meters such as NFC, Bluetooth, IrDA, Wi-Fi, RFID, etc.), memory for storing instructions and data, and a computing apparatus. When the computing apparatus executes the instructions, and when the magnetic strip card reader is in the installed position thereof, information encoded in the magnetic strip on the planar substrate is read by the magnetic strip card reader. Also, there is derived, from the information encoded in the magnetic strip on the planar substrate, an identifier for an account issued by an issuer. A transmission, using the short range communications apparatus, is made that includes the identifier for the account. By way of example, the transmission can be addressed to a Merchant's Point of Service terminal (POS). There is then received, using the short range communications apparatus, and in response to the transmission of the identifier for the account, a total currency amount of a transaction with a merchant being conducted on the account by use of the cellular telephone. The display screen can then be used to render a prompt requesting authorization of a withdrawal of the total currency amount for the transaction from the account. There is then received, from the input device in response to the rendered prompt, an indicator as to an approval of the requested authorization for the withdrawal of the total currency amount for the transaction from the account. A transmission can then be made, using the using the short range communications apparatus, of the information corresponding to the indicator. In response to the transmission of the information corresponding to the indicator, there is then received, using the short range communications apparatus, a remaining currency balance in the account which can be rendered on the display screen.

In another implementation, a World Wide Web (Web) enabled wireless mobile communications apparatus can include means for reading a data bearing card. For example, the means for reading a data bearing card can be a bar code reader, a magnetic strip reader, of other card reader for a Subscriber Identity Module (SIM) card, a smart card, an 'EMV' card, etc. In this implementation, the data bearing card can be a gift card. The Web enabled wireless mobile communications apparatus can also include a user interface having means for displaying (e.g.; a touch screen, a LCD screen, etc.) and a means for receiving input (e.g.; a key board, a touch screen, a microphone, etc.). Means for transreceiving wireless communications over the Internet will also be included with the Web enabled wireless mobile communications apparatus (e.g., hardware executing software for communications to and from logical Internet addresses). The Web enabled wireless mobile communications apparatus will include means for storing instructions and data (e.g., a memory hardware device) and a computing means for executing the instructions (e.g., a processor executing software). When the instructions in the means for storing are executed by the computing means, the computing means: (i) executes a Web browser providing interactive communications with the Web; (ii) when the means for reading a data bearing card is in the installed position thereof, reads, using the means for reading a data bearing card, information encoded in memory of the data bearing card; (iii) derives, from the information encoded in the memory of the data bearing card, an identifier for an account issued by an issuer; (iv) transmits, using the wireless communications apparatus, the identifier for the account for delivery to a logical Internet address; (v) receives, from a logical Internet address, using the means for transreceiving wireless communications, in response to the transmission of the identifier for the account, a total currency amount of a transaction with a merchant being conducted on the account by use of the wireless mobile communications apparatus; (vi) renders, using the means for displaying, a prompt requesting authorization for withdrawal of the total currency amount for the transaction from the account; (vii) receives, from the means for receiving input of the user interface, in response to the rendered prompt, an indicator as to an approval of the requested authorization for the withdrawal of the total currency amount for the transaction from the account; (viii) transmits, using the means for transreceiving wireless communications, information corresponding to the indicator for delivery to a logical Intern et address; (ix) receives, from a logical Internet address, using the means for transreceiving wireless communications, in response to the transmission of the information corresponding to the indicator, a remaining currency balance in the account; and (x) renders, using the means for displaying, in response the receiving of the remaining currency balance in the account, the remaining currency balance in the account.

FIG. 1 depicts an exemplary process 100 which begins at step 102 and continues to step 104 at which a purchase is made by a consumer of a payment card, such as a gift card. The gift card, which bears information about an account, can be used at any merchant that accepts the account (open loop), where the account was issued by an issuer. The gift can be card be composed physically of paper, non-plastic card stock, or plastic, or the gift card be virtual and be merely logically associated with the account. In an alternative implementation, the gift card will have a limited number of merchants that will accept the account (closed loop).

At steps 106-108 of method 100, the gift card is associated with a mobile device (i.e., 122-128) operating through a wireless system 120. The mobile device can be a cellular telephone, Personal Digital Assistant (PDA), or World Wide Web ('Web') enabled computing device having a client that executes a Web browser to access the Internet and Web sites on the World Wide Web. In the case where the gift card is a magnetic strip card, a computer chip, an EMV chip, a 'smart card', etc., the card can be inserted, so as to be read, into a card reader slot of the mobile device. Alternatively, information about the account of the gift card can also be input to the mobile device via a user input device associated with the mobile device. Thereafter, at steps 110-112, the mobile device can use its communications capabilities to complete an association with the account of the gift card such that transactions on the account can be conducted with merchants at various locations by use of the mobile device.

Figure 2:
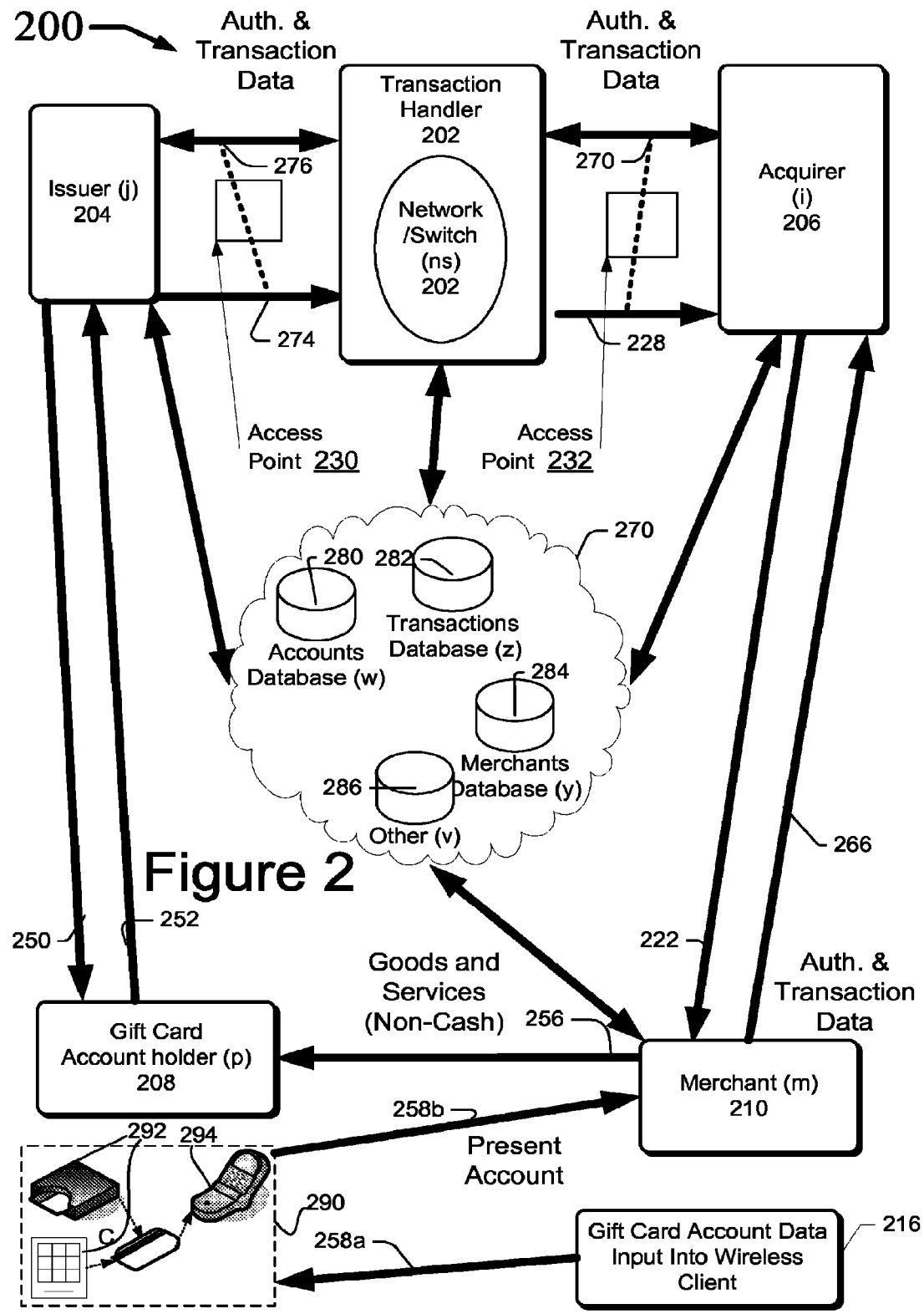
FIGS. 2-3 depict exemplary payment processing systems for processing an acquired transaction conducted on an account issued to consumer with a merchant.

FIG. 2 depicts an exemplary process for the provision of a service by a merchant to a consumer in authorizing a remunerating electronic payment by an account holder (p) 208 in conducting a financial transaction with the merchant (i.e.; a gift card transaction on an account). The diagram of FIG. 2 depicts an exemplary process 200 of a particular financial transaction system. By way of explanation for the nomenclature of reference numerals used in the Figures and described in the specification, a lower case letter in parenthesis is intended to mean an integer variable having a value from 1 to the capital case of the lower case letter, which value can be large (i.e., approaching infinity). Thus '(b)' is intended to mean that the integer 'b' can have a value from 1 to B, and '(c)' is intended to mean that the integer 'c' can have a value from 1 to C, etc. As such, drawing elements 204, 206, 208, 210, 280, 282, 284, and 286 in FIG. 2 are illustrated with a block, but indicate one or more elements can be present. For example, Issuer (j) 204 is one of a possible plurality of issuers, where j may range from 1 to a large integer.

A gift card, seen at reference numeral 290) is obtained, such as will be described below as to FIGS. 4-5, by an Account holder (p) 208 who associates at arrow 258a the account thereof with a mobile device 290 that includes a client-executing wireless mobile computing apparatus 294 having a card reader 292 for reading a card. By way of alternative possible examples, and not by way of limitation, card reader 292 can read a gift card, a debit card, a credit card, a prepaid card, etc.

By way of alternative possible examples, and not by way of limitation, the form factor of the cards that the card reader 292 can read include: (i) a memory storage card in a non-volatile memory card format as is suitable for use in portable devices; (ii) a smart card, EMV card, chip card, or integrated circuit card (ICC); (iii) a thin substrate card bearing a data-encoded magnetic stripe, where the card may be composed of non—durable materials intended to be disposable such as paper or paper-like products; (iv) a PC Card such as a Personal Computer Memory Card International Association (PCMCIA) card; (iv) a removable Subscriber Identity Module (SIM) card, etc. The memory storage card implementation will preferably be a flash memory card, and will preferably conform to a Secure Digital (SD) card standard or extension thereof. The smart card implementation will preferably be a card having embedded integrated circuits which can process data. The SIM card implementation will preferably conform to a SIM card standard or extension thereof, including a card having a width of 25 mm, a length of 15 mm, and a thickness of 0.76 mm.

In one implementation, the client-executing wireless mobile computing apparatus 294 is a cellular telephone having an integrated card reader 292 that reads a region of a card that bears data that encodes a specific number or code that identifies an account issued by a merchant or a financial institution (e.g., a bank). Data encoded on the card, which will be preferably encrypted, will not identify the card holder. The encoded data may be in the form of a barcode, a magnetic strip, or other data encoding memory structure that can be read by card reader 292. Preferably, the card will have no value and will not be a stored value card. Rather, the card will have redeemable value when sold by a merchant to cardholder at which time the merchant enters a currency amount for which the card is to be redeemable. The currency amount, however, will not be stored on the card. Rather, the currency amount will be stored in a database controlled by the issuer of the account, or agent thereof, that is identified by the encoded data on the card. As such, the database is cross-linked to the account.

At arrow 258b, Account holder (p) 208 wirelessly communicates using the mobile device 290 with a Merchant (m) 210 so as to make a tender for a financial transaction on an account for the purchase of goods or services. The wireless communication will preferably have a range of less then around 300 meters or 1000 feet. For example, one such communications protocol is Near Field Communication (NFC) which is a short-range high frequency wireless communication technology which enables the exchange of data between devices over about a 10 centimeters (around 4 inches) distance. Another example is the 'Bluetooth' communications protocol which is an open wireless protocol for exchanging data over short distances from fixed and mobile devices This technology, which can connect electronic devices without using a cable, permits the exchange of data at ranges of up to 10 meters. Alternatively, a Radio-frequency identification (RFID) communications protocol can be used which also reading of data from a card from several meters away. In still a further alternative, a local area network wireless communications protocol, such as Wi-Fi, can be used for communications having a range of less than about 300 meters.

Those of skill in the art will recognize that other financial transactions and instruments other than gift cards may also be used, including, but not limited to, a prepaid card and a debit card. For purposes of illustration and explanation, however, reference will be made to a gift card, such as an open loop gift card. Typical of gifts cards is that they are not reloadable with additional currency deposits to a corresponding account. The gift card can have a predetermined value that is activated by a mobile device (e.g., a cell phone).

By way of alternative possible examples, and not by way of limitation, and as part of the transaction, the Account holder's 208 mobile device 290 can be a cellular telephone, Personal Digital Assistant (PDA), etc. The removable gift card installed in the device 290 is read by a card reader to obtain there from an identifier for a gift card account. Alternatively, the identifier for the account can be contactlessly read from the installed gift card by a wireless or contactless communications device operated by the merchant (m) 210.

The identifier and other data regarding the account is read from, or transmitted by, the mobile device 290. A request for authorization, including account related information is transmitted by the Merchant (m) 210 to the Merchant's 210 Acquirer (i) 206 (at step 262). Each Acquirer (i) 206 is a financial organization that processes transactions on accounts for businesses, for example merchants, and is licensed as a member of a transaction handler (TH) 202 such as a credit card association (i.e., Visa Inc., MasterCard, etc.) As such, each Acquirer (i) 206 establishes a financial relationship with one or more Merchants (n) 210.

The Acquirer (i) 206 transmits the account information to the TH 202 (at step 270), who in turn routes the request to the account holder's issuing bank, or Issuer (j) 204 (at step 276). The Issuer (j) 204 returns authorization information to the TH 202 (at step 274) who returns the information to the Merchant (m) 210 through the Acquirer (i) 206 (by steps 268 and 266). The Merchant (m) 210, now knowing whether the Issuer's (j) 204 account is valid and supports a sufficient account balance, may complete the transaction and the Account holder (p) 208 in turn receives goods and/or services in exchange (at step 256). Most financial payment card associations instruct merchants that, after receiving authorization, the detailed account information obtained at the point of sale (e.g., via a magnetic stripe scanner) must be deleted or other which not kept at the point of sale.

To reconcile the financial transactions and provide for remuneration, information about the transaction is provided by the Merchant (m) 210 to Acquirer (i) 206 (at step 262), who in turn routes the transaction data to the TH 202 (at step 270) who then provides the transaction data to the appropriate Issuer (j) 204 (at step 276). The Issuer (j) 204 then provides funding for the transaction to the TH 202 (at step 274) through a settlement bank (not shown). The funds are then forwarded to the Merchant's (n) 210 Acquirer (i) 206 (at step 268) who in turn pays the Merchant (m) 210 for the transaction conducted at step 262 less a merchant discount, if applicable. The Issuer (j) 204, then bills the Account holder (p) 208 (at step 250), and the Account holder (p) 208 pays the Issuer 204 (at step 252), with possible interest or fees.

Each of the Issuer (j) 204, Merchant (m) 210, Acquirer (i) 206 and the TH 202 may have access to information resources having one or more of the following databases: transaction database (z) 282, merchant database (y) 284, or account database (w) 280. These databases can be connected by a network, internet, virtual private network, or by other means known to those skilled in the art. Moreover, not every participant must necessarily have access to any or all of the databases. Each database can assign read, write, and query permissions as appropriate to the various participants. For example, a Merchant (m) 210 have read access to the account database (w) 280 and the Issuer (j) may have read and write access. Also, the account database (w) 280 may keep the currency balance of each account corresponding to a gift card, where the account database (w) 280 is updated as to the currency balance of each account in real time with each transaction on each gift card account.

The transaction database (z) 282 is designed to store some or all of the transaction data originating at Merchant (m) 210 who uses a payment device for each transaction conducted between an Account holder (p) 208 and the Merchant (m) 210. The transaction data can include information associated with the account of an Account holder (p) 208, date, time, and location among other more specific information including the amount of the transaction. The database can be searched using account information, date and time (or within proximity thereof), or by any other field stored in the database.

The Merchant database (y) 284 is designed to store information about each Merchant (m) 210. The Merchant database (y) 284 can contain information such as the unique identification of each Merchant (m) 210, an identifier for each point of sale device in use by the Merchant (m) 210, and location of the Merchant (m) 210.

The account database (w) 280 is designed to store account information for payment devices associated with Account holder (p). The account database (w) 280 can store part or all of an account number, account information, account name, etc. The information from the account database (w) 280 can be associated with information from the transaction database (z) 282. Other information, accessible through the 'cloud' seen in FIG. 2, can be in a database (v) 286.

An Account holder (p) 208 initiates a transaction with a Merchant (m) 210 by presenting a payment device at step 258 to the Merchant (m) 210. The payment device is typically presented at the Point Of Service terminal (POS) at which data thereon is read. Certain transaction information is transmitted from the POS in route to the Merchant's (n) 210 Acquirer (i) 206. The transaction information can include account information, account name, transaction balance, transaction time, transaction date, and transaction location. This transaction information may be transmitted via a communication medium, where the transmission of transaction data is between two or more points from the point of origin, such as the point of sale device at the Merchant (m) 210, and the ultimate destination, such as the Acquirer (i) 206. These points can include, without limitation, from the reader at the POS, the POS at the Merchant (m) 210 and a network router or computer that is connected to a network but is housed and maintained by the Merchant (m) 210 and between the Merchant (m) 210 and the Acquirer (i) 206. The communication channel could be Ethernet, wireless internet, satellite, infrared transmission, or other known communication protocols. Some or all of the transmission may also be stored for record keeping, archival or data mining purposes. For example, the Merchant (m) 210 may store transaction data, including certain account information in the Merchant's (n) 210 accounts on file database for reuse later.

In this process, transaction information is retrieved from the POS at a Merchant (m) 206. The transaction information is comprised of account information together with other information about the transaction itself: time, date, location, value, etc. Certain of the transaction information is considered sensitive information including, without limitation, account number, card verification number, and account name.

Figure 14:
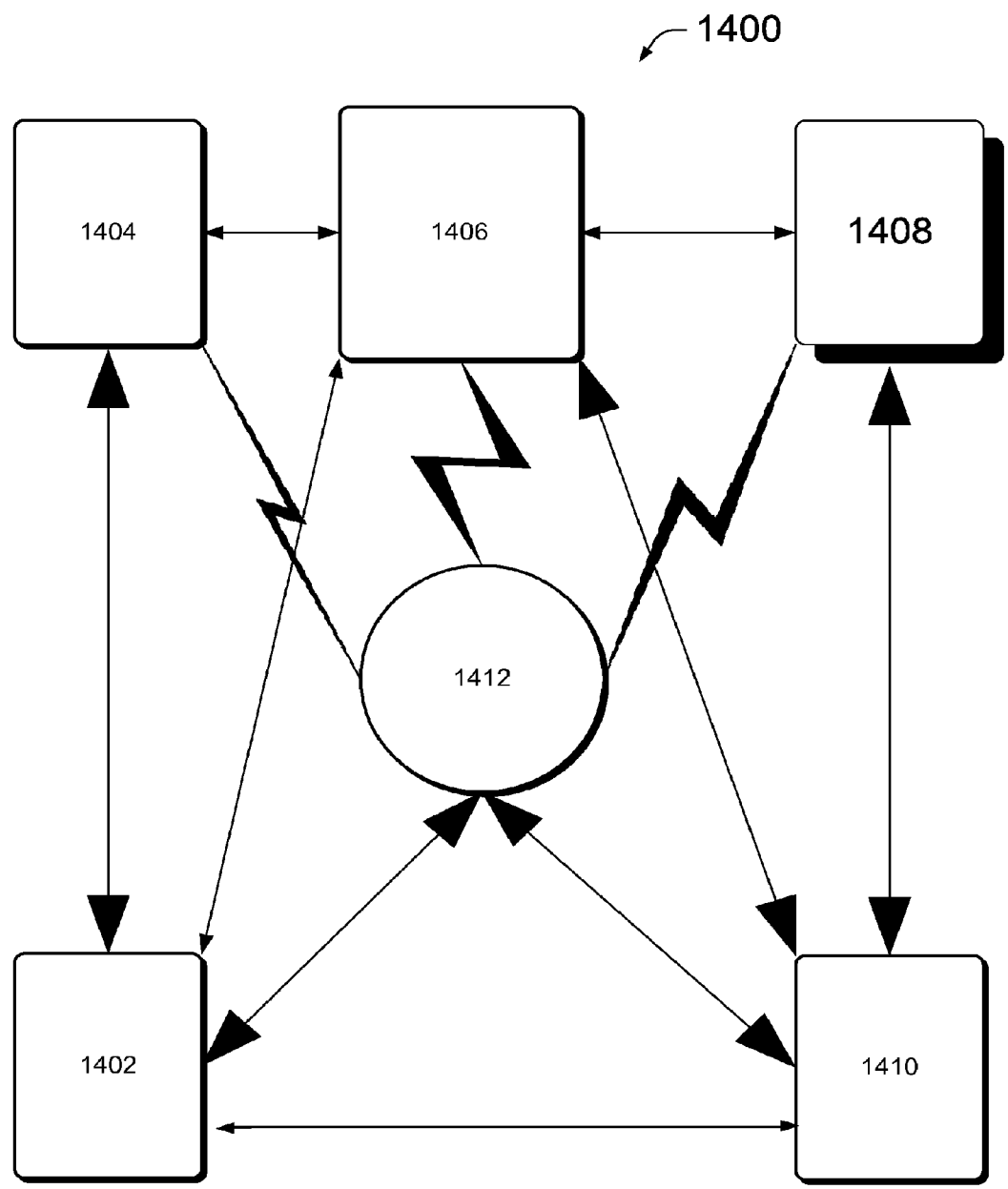
FIG. 14 illustrates a block diagram of an exemplary payment processing system within which a mobile consumer electronics device having wireless communications functionality and being associated with an account of a gift card can be used by a consumer to conduct a cashless transaction on the account in the environments depicted in FIGS. 2-3.

FIGS. 2 and 14 include one or more transaction handlers 202, 1406, access points 230, 232, acquirers 206, 1406, and issuers 204, 1404. Other entities such as drawee banks and third party authorizing agents may also connect to the network through an access point. An interchange center is a data processing center that may be located anywhere in the world. In one implementation, there are two in the United States and one each in the United Kingdom and in Japan. Each interchange center houses the computer system that performs the network transaction processing. The interchange center serves as the control point for the telecommunication facilities of the network, which comprise high speed leased lines or satellite connections based on IBM SNA protocol. Preferable, the communication lines that connect an interchange center (transaction handlers 202, 1406) to remote entities use dedicated high-bandwidth telephone circuits or satellite connections based on the IBM SNA-LU0 communication protocol. Messages are sent over these lines using any suitable implementation of the ISO 8583 standard.

Access points 230, 232 are typically made up of small computer systems located at a processing center that interfaces between the center's host computer and the interchange center The access point facilitates the transmission of messages and files between the host and the interchange center supporting the authorization, clearing and settlement of transaction. Telecommunication links between the acquirer (q) 206 and its access point, and between the access point and issuer (i) 204 are typically local links within a center and use a proprietary message format as preferred by the center.

A data processing center (such as is located within an acquirer, issuer, or other entity) houses processing systems that support merchant and business locations and maintains customer data and billing systems. Preferably, each processing center is linked to one or two interchange centers. Processors are connected to the closest interchange, and if the network experiences interruptions, the network automatically routes transactions to a secondary interchange center. Each interchange center is also linked to all of the other interchange centers. This linking enables processing centers to communicate with each other through one or more interchange centers. Also, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

TH 202 may process a plurality of transactions within the transaction processing system 200. TH can include one or a plurality or networks and switches (ns) 202. Each network/switch (ns) 202 can be a mainframe computer in a geographic location different than each other network/switch (ns) 202, where 'ns' is an integer from one to NS, and where NS can be as large as a four digit integer or larger.

Access points 230, 232, which may be dedicated communication systems (e.g., private communication network(s)) facilitating communications 274, 276 between the transaction handler 202 and each issuer (i) 204, and) facilitating communications 228, 270 between the transaction handler 202 and each acquirer (a) 206. A Network 270, via e-mail, the World Wide Web, cellular telephony, and/or other optionally public and private communications systems, can facilitate communications among and between each issuer (i) 204, each acquirer (a) 206, each merchant (m) 210, each account holder (a) 208, and the transaction handler 202. Alternatively and optionally, one or more dedicated communication systems can facilitate respective communications between each acquirer (a) 206 and each merchant (m) 210, each merchant (m) and each account holder (a) 208, and each account holder (a) 208 and each issuer (i) 204, respectively.

The Network 270 may represent any of a variety of suitable means for exchanging data, such as: an Internet, an intranet, an extranet, a wide area network (WAN), a local area network (LAN), a virtual private network, a satellite communications network, an Automatic Teller Machine (ATM) network, an interactive television network, or any combination of the forgoing. Network 270 may contain either or both wired and wireless connections for the transmission of signals including electrical, magnetic, and a combination thereof. Examples of such connections are known in the art and include: radio frequency connections, optical connections, etc. To illustrate, the connection for the transmission of signals may be a telephone link, a Digital Subscriber Line, or cable link. Moreover, network 270 may utilize any of a variety of communication protocols, such as Transmission Control Protocol/Internet Protocol (TCP/IP), for example. There may be multiple nodes within the network 270, each of which may conduct some level of processing on the data transmitted within the transaction processing system 200.

Figure 3:
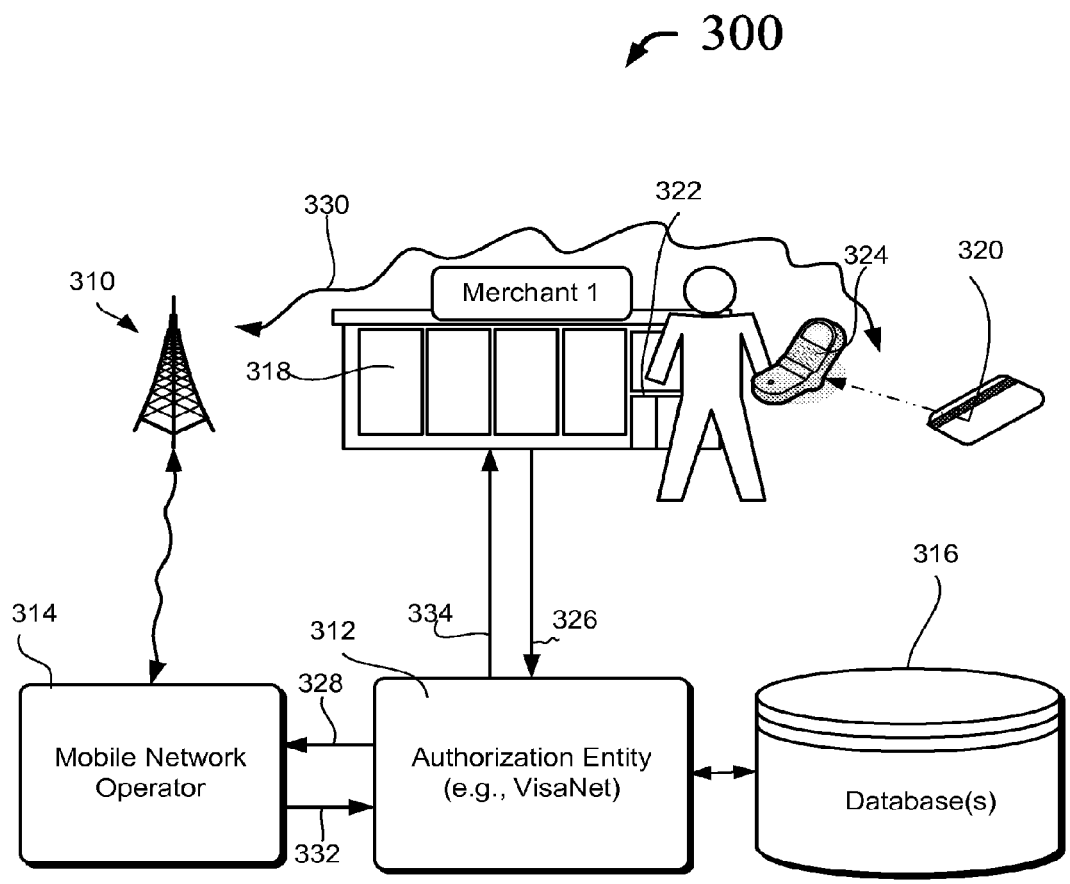

FIG. 3 is a schematic diagram illustrating a system including an authorizing agent, in the context of an exemplary system 300, in which a consumer 320 attempts a purchase on an issued account of a resource from a resource provider 318, where the system 300 includes one or more mobile network operators 314. In addition, system 300 may include a general database 316 that includes, among other sub-databases, an account database, an issuer database, a merchant database, and an acquirer database.

Consumer 320 installs a removable open loop gift card 322 in a wireless mobile communications consumer apparatus 324. The consumer apparatus 324 may take any of several different forms including but not limited to, for example, a mobile cellular telephone, a key fob on a key ring, a portable computer such as a personal digital assistant (PDA), a wearable article of clothing such as a belt buckle or a wearable article of jewelry such as a ring, a button, a pin, etc. In the interest of simplifying this explanation, unless indicated otherwise, it will be assumed that the consumer apparatus 324 will be referred to as a mobile wireless telephone or 'cell phone'.

Referring still to FIG. 3, mobile network operator (MNO) 314 provides mobile computing and communication services such as cellular phone services, paging services, data transmission services, and so on. In at least some implementations of the present invention, authorization entity 312 is linked to the mobile network operator 314 for two-way communication. The network operator 314 can communicate wirelessly with mobile phone 324 to provide information thereto and received information there from.

Referring yet again to FIG. 3, an authorization entity 312 may be any entity that authorizes open loop gift card purchases for merchants or other resource providers. For example, in some cases a transaction handler (i.e. like VISA Inc. and MasterCard) may be exemplary authorization entities. In other cases an issuer may operate as an authorization entity 312. The authorization entity 312 is linked via a computer network (e.g., the Internet, a private network, etc.) to each of the merchant POS devices via other system 300 entities (e.g., an acquirer, a transaction handler, etc.) so that the entity 312 and merchants 318 have two-way communication. As implied by the label, the authorization entity 312 receives information from the merchant 318 associated with an attempted purchase by a consumer 320, verifies that a consumer account of the open loop gift card used to attempt a purchase is valid and that the amount of that purchase is acceptable and then authorizes the purchase. Where an account is invalid or the value of currency in the account of the open loop gift card is insufficient to cover a purchase, authorization is denied. Hereinafter, unless indicated otherwise and in the interest of simplifying this explanation, it will be assumed that a transaction handler is the authorization entity 312.

An exemplary retail transaction occurring within the illustrated system 300 begins when a consumer, or account holder 320, wishes to pay for goods or services from a merchant 318. Merchant 318 subsequently presents a total due to the account holder 320 (arrow 325). The merchant 318 further generates other financial and non-financial transaction data. Other possible financial transaction data includes sales tax, applied discounts such as coupons, and the like. Non-financial transaction data may include the date and time of the transaction, merchant identity, a store identifier, and the like.

Account holder 320 presents to the merchant 318 an account as tender for the transaction. The account will preferably be that of an open loop gift card removably installed in the cell phone 324. Alternatively, the account information can be read into volatile or non-volatile memory of the cell phone 324, such as by input into an input device of the cell phone 324 such that the cell phone 324 stores information identifying the account associated with the open loop gift card.

After wirelessly presenting the account with the cell phone 324 to the merchant 318, data for the gift card account is transmitted, or is otherwise accessed by, the merchant 318. In one alternative, the communication between cell phone 324 and merchant 38 can be made contactlessly, such as via technology of the payWave™ system, which employs radio frequency communications technology to read the data stored in the cell phone 324. The account information, including an account identifier, is combined by the merchant 318 with the transaction data, including a total due, to form an authorization request. The authorization request is then transmitted to an acquirer associated with the merchant 318. Each acquirer is a financial organization that processes open loop gift card transactions for businesses, including the merchant, and is approved by a transaction handler such as VISA U.S.A., Inc.

The acquirer transmits the authorization request to the transaction handler, which in turn routes the request to the issuing bank, or issuer of the account. The transaction handler maintains a log of authorization requests a consumer database (e.g.; one of the databases 316). The issuer approves or rejects the authorization request and returns an approval or rejection message to the transaction handler which relays this information to the merchant 318 via the acquirer. The merchant, now knowing whether the account issued by the issuer is valid and supports a sufficient gift card balance, completes the transaction. The account holder in turn receives the desired goods and/or services in exchange.

Although not illustrated, it is contemplated that two or more open loop gift card account numbers could be associated with the cell phone 324. Similarly, in some cases a single account number of an open loop gift card may be associated with two or more cell phone 324 (e.g., where a consumer has both a work mobile phone and a personal mobile phone).

Figure 4:
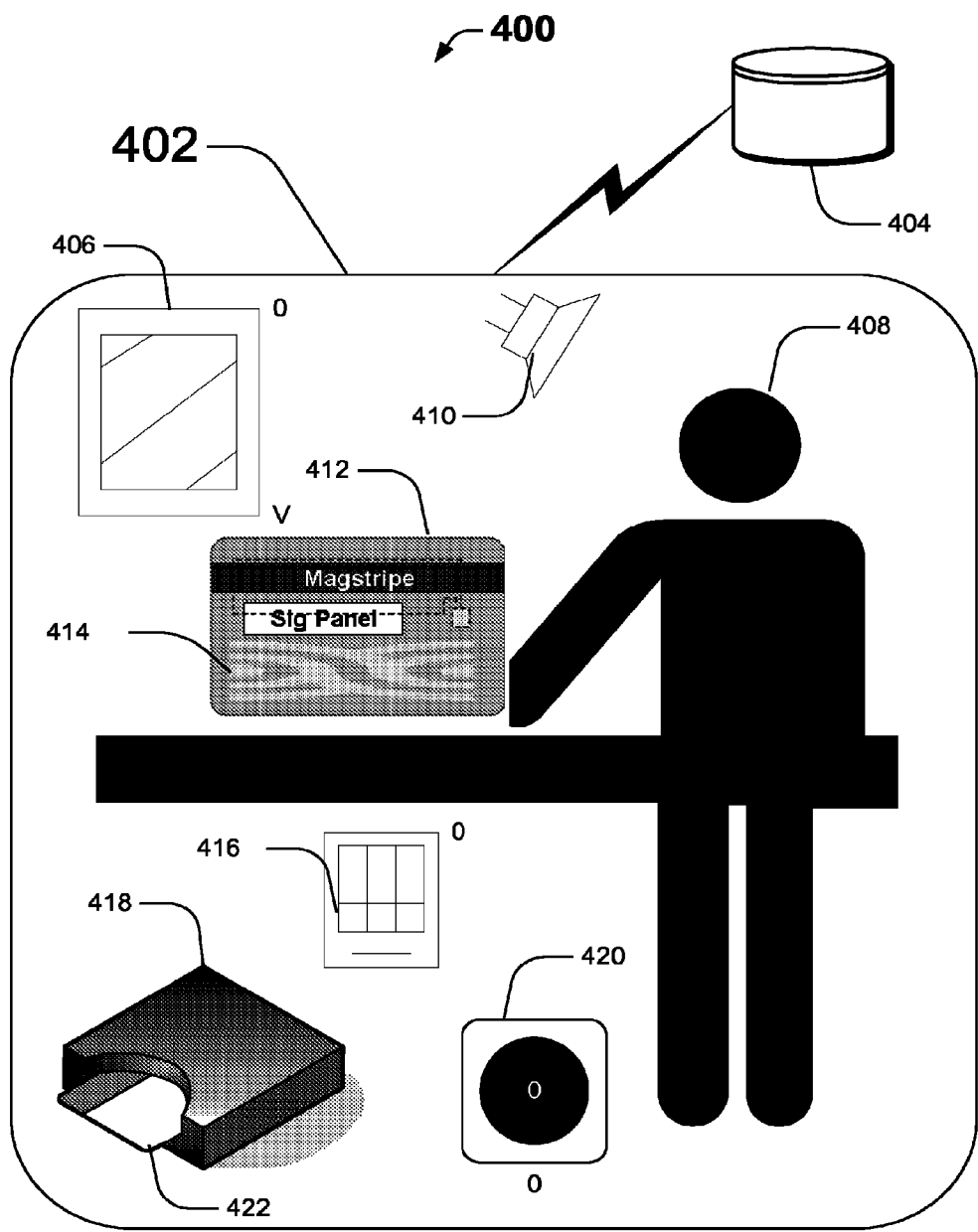
FIG. 4 depicts an exemplary implementation of a kiosk having a user interface operable by a consumer for obtaining a gift card that includes information pertaining to a currency bearing account that can be associated with a mobile device, and thereafter the mobile device will, in effect, be able transact upon the monetary amount debited to the account corresponding to the gift card.

FIG. 4 depicts an exemplary implementation of a kiosk 402 having a user interface operable by a consumer 408 for obtaining a card 412, such as an open loop gift card, for storing a non-refundable monetary amount debited to an account. The account, which has been issued by an issuer, can then be further associated with a mobile device (e.g., a cell phone) such that the account associated with the mobile phone is useable as negotiable currency for a transaction with a merchant. Although the implementation is discussed in regards to a substantially planar laminated card, one skilled in the art will recognize that other forms of financial transaction tokens could be used in the disclosed method (e.g.; key fob, key ring token, etc.) Also, implementation of the prepaid payment device can assume a form factor and other features substantially like that of a portable consumer payment device, such as a credit or debit card, adapting for instance to requirements of ISO 7810, ISO 7811, ISO 7816, and/or ISO 14443.

The kiosk 402 itself communicates with a database 404 capable of storing and relating information regarding the payment system with which the open loop gift card is associated. The consumer 408 is presented with a selection various denominations of open loop gift cards from which the consumer can make the selection by a user interface 406 of the kiosk. The user interface 406 may included a display which can be a touch screen, a digital electronic display, a projector, a monitor, any combination of the foregoing, or any other device for the presentation of digital and/or analog information. Additionally, the kiosk 402 may have a speaker 410 or other device capable of rendering audible instructions and information to the consumer 408.

The consumer 408 makes selections using an input device 416. The input device 416 may be a key pad, a touch screen, a pointing device, an audio input device, a video input device, a cash bill and/or coin receiver, any combination of the foregoing, or other hardware and/or software combinations capable of receiving and transforming data for use by the kiosk 402. The consumer 408 then uses the input device 416 to select the monetary amount to be credited to an account associated with the gift card 412, such as an open loop gift card. Choices for the monetary amount may be presented on the user interface 406 or the consumer may directly input the monetary amount using the input device 416. Consumer 408 makes a payment for the monetary amount to be credited to the account using mechanisms of the kiosk 402 associated with a cash receptacle 420 and/or a payment device receptacle 418. Thus, consumer 408 can make the payment to the account of the gift card 412 using cash, a prepaid spending card, a credit card, a debit card, or a combination of the foregoing. As mentioned above, the monetary amount credited to the account can be associated with a cellular telephone (or other wireless device) by installation of the removable gift card 412 therein. The wireless device can then be used by the consumer 408 for a future transaction with a merchant.

After payment, in one implementation, the consumer 408 receives the gift card 422 from the payment device receptacle 418, which can be both a financial transaction token reader and a slot from which the gift card 412 is ejected from the kiosk 402. Of course, these two mechanisms can also be separate mechanisms in the kiosk 402. In yet other implementations, the consumer 408 may receive the gift card 412 via another device, or by later third party delivery to the consumer 408.

Information can be stored on the card 412 regarding the associated account. Preferably, in the case of a gift card, the monetary amount added by the consumer 408 for a future transaction with a merchant will not be stored on the card. The information about the gift card account may be stored using a magnetic strip, memory in communication with a processor and/or other integrated circuit, a contactless data communication device, a combination of any of the foregoing, or any other method and mechanism of storing information on a card.

Figure 5:
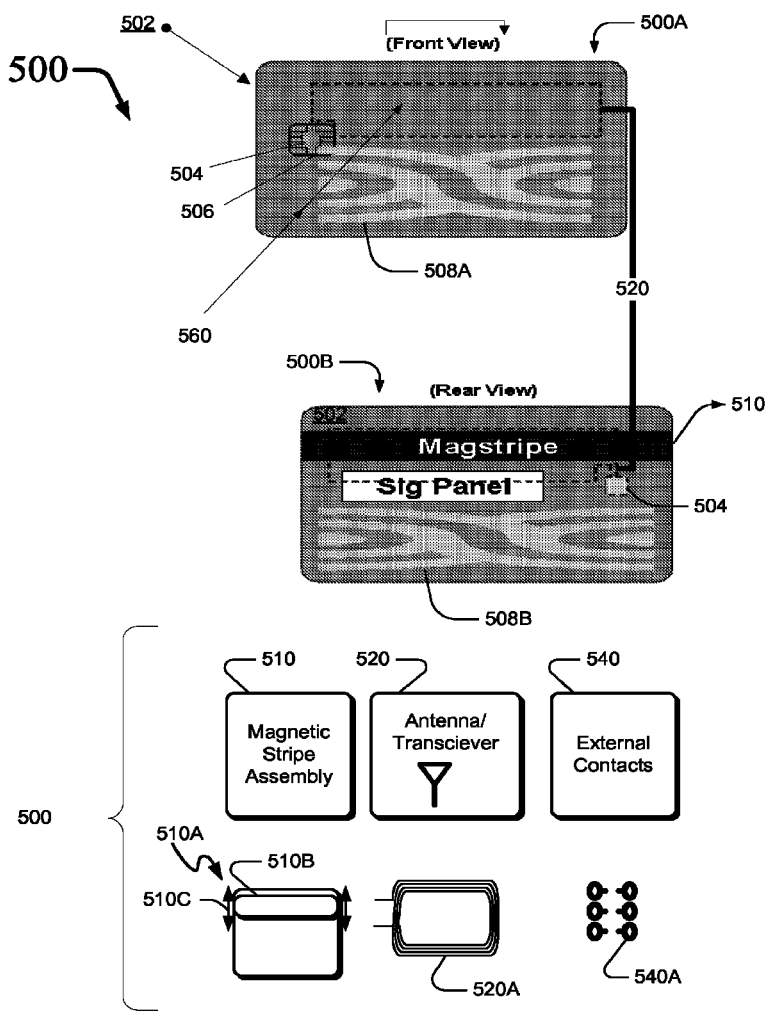
FIG. 5 illustrates an exemplary implementation of the gift card of FIG. 4.

Referring now to FIGS. 4-5, both a front and rear views (500A, 500B) of an exemplary gift card 502, such as an open loop gift card, are presented. Images may be displayed on both sides of the gift card 502, with an image 508A on the front view 500A being either the same as or different from an image 508B on the rear view 500B. By way of example, and not by way of limitation, gift card 502 can be a smart card, such as a EMV card.

FIG. 5 also shows exemplary implementations of a data encoding area of the gift card 502. The data encoding area may include an optional shielding element, which allows desired electromagnetic, optical, or radiative signals to penetrate while protecting the data encoding area from physical abuse or damage. The gift card 502 may optionally have areas outside of the data encoding area shielded from physical abuse or otherwise acceptable forms of electromagnetic radiation. Some of the acceptable signals that are allowed to penetrate the shielding and may include, but are not limited to, signals accompanying a magnetic field, RFID signals, IrDA signals, visible light, invisible light, modulated laser, and/or modulated RF communication signals. By way of example and not by way of limitation, a selective shielding element may comprise a clear plastic shield, conformal coatings, an opaque plastic shield, or a clear thin film, depending on the implementation of the data encoding area.

Non-limiting examples of the data encoding area are shown at reference numeral 500, and include a magnetic stripe assembly 510, an antenna and/or transceiver 520, and electrical contacts 540, The magnetic stripe assembly 510 may comprise, in one implementation 510A, a reprogrammable magnetic stripe 510B that accepts data and/or commands from a processor and formats and renders that data into a form on a magnetic stripe that is readable by conventional merchant magnetic stripe-reading point of sale (POS) terminals. In this manner, the processor may program a particular account for use in a transaction as a function of user input selecting the account. Alternatively, the processor may erase the magnetic stripe of the assembly 510, rendering the card useless in the event of its loss or theft. In one implementation shown 510A, the magnetic stripe assembly 510B at least partially slidably moves 510C into and out of an assembly of the prepaid payment device 502 (partial view shown), allowing the prepaid payment device 502 to conduct a financial transaction at a point of sale terminal that includes a magnetic stripe reader.

Also in FIG. 5 is an exemplary implementation of the data encoding area shown as an antenna and/or transceiver 520. The antenna 520 may include commonly used loop inductors such as the one shown 520A or in those shown in related ISO standards for RF-readable smart cards. With such an interface, account data may be translated, modulated and transmitted in a manner acceptable by an RF contactless merchant POS terminal, a 802.11 WiFi or WiMax network, or by a cellular or RF communications network.

External contacts 540 are yet another alternative implementation of the data encoding area shown in FIG. 5. With the gift card 502 possessing physical contacts such as an array of conductive pads or shapes 540A, the financial transaction token may be placed in physical contact with a merchant Point of Service (POS) terminal, and the external contacts 540 may establish connectivity to the merchant's financial processing system. The processor may relay account-related information to the merchant POS terminal through the contact interface, thereby allowing the gift card 502 to be utilized with the large number of preexisting merchant POS terminals.

The account of the gift card 502 obtained from the kiosk 402 is thereafter associated with a mobile device. In the case where the gift card is a computer chip or 'smart card', the card can be inserted into a card reader slot of the wireless mobile device. Alternatively, information about the account of the gift card can also be input to the mobile device via a user input device associated with the mobile device.

Figure 6:
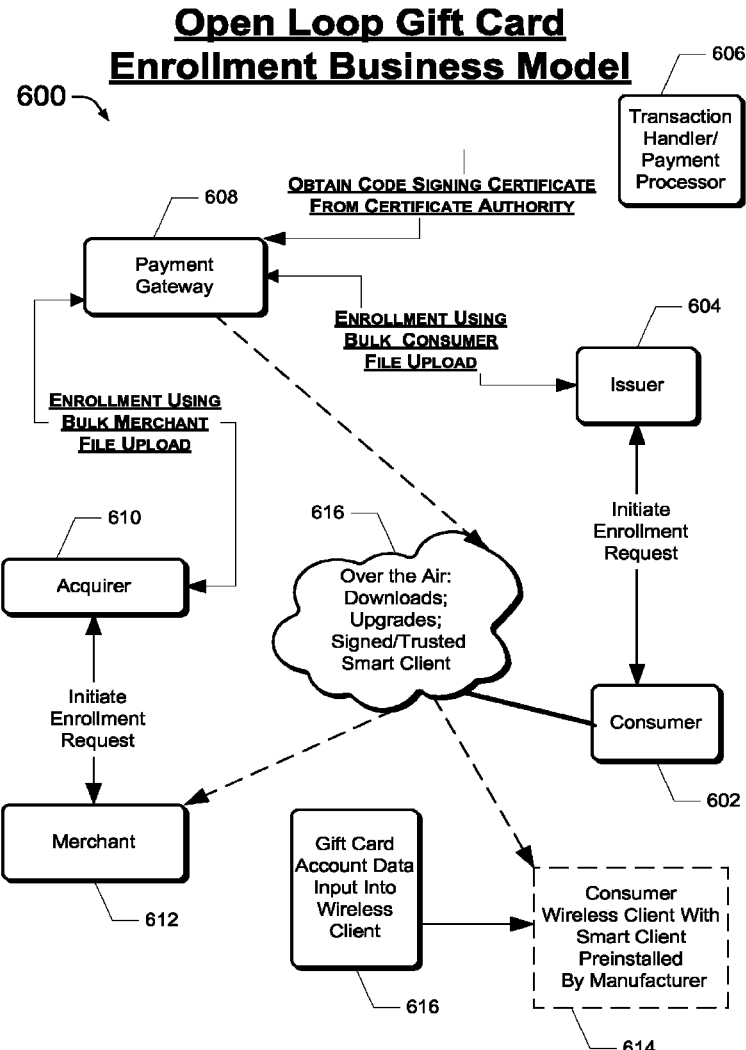
FIG. 6 is a block diagram illustrating an exemplary environment having a process flow of a business model to enroll accounts respectively issued by an issuer, each account being associated with a gift card, each account being the kind that can be associated with a wireless consumer electronics device that will then be useable for wireless cashless transactions on the account that will be conducted by consumers with merchants in the environments depicted in FIGS. 2-3 and 14.

FIG. 6 shows an exemplary model 600 for enrolling mobile devices for use in a payment processing system. Account data for an open loop gift card is input into a wireless client (i.e., an enrolled mobile device) as shown at 616, such as by installation of the gift card into the wireless client so as to be read by same. In model 600, a consumer 602 has an account of a gift card issued by an issuer 604.

The consumer 602 can use an enrolled mobile device to conduct one or more transactions with a merchant 612. The merchant 612 submits the transaction with consumer 602 to an acquirer 610. The transaction is submitted from acquirer 610 to a transaction handler/payment processor 606.

In the enrollment process of model 600, the issuer 604 initiates an enrollment request with consumer 602. The issuer 604 communicates with a payment gateway 608 to facilitate the enrollment using a bulk customer file upload of a plurality of such consumers 602. The payment gateway 608 obtains code for signing a certificate from a certificate authority in communication with the transaction handler/processor 606. The acquirer 610 communicates with payment gateway 608 for a submission of enrollment with a bulk merchant file upload, thereby initiating enrollment requests for a plurality of merchants 612.

In one implementation, consumer wireless devices with smart cards can be preinstalled by the manufacturer as shown at box 614, whereby there has been a pre-enrollment for each consumer 602 using such a consumer wireless client 612. Network communication capability is illustrated at cloud 616 showing the capability of over-the-air downloads and upgrades, as well as signed and trusted smart client capabilities. As shown, the network capability extends from cloud 616 with payment gateway 608, consumer 602, consumer wireless client 614, and merchant 612. Payment gateway 608 may be the centralized gateway that is hosted on behalf of the issuer 604 and on behalf of the acquirer 610.

Figure 7:
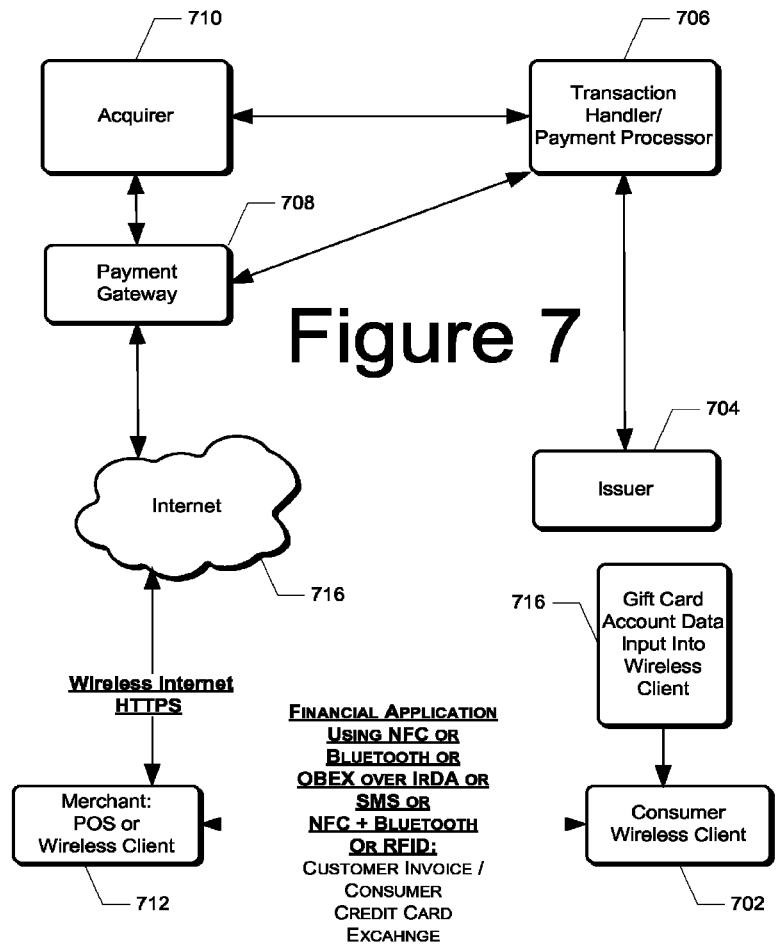
FIG. 7 is a flow chart depicting an exemplary method for a person to make a payment in a cashless transaction to a merchant using the wireless consumer electronics device of FIG. 6.

An exemplary method 700 for a proximity payment transaction flow is illustrated in FIG. 7. Account data for an open loop gift card is input into a consumer wireless client 702 as shown at 716, such as by installation of a removable card into wireless client 702 so as to be read by same. In method 700, the consumer wireless client 702 does a proximity payment with merchant 712. Merchant 712 can participate in the transaction by using a point of service terminal or using a wireless client, or both. The particular communication between merchant 712 and client 702 will be through the use of a financial application. The merchant 712 can communicate by using a Near Field Communications capability (NFC) or by using Bluetooth communications. Alternatively, the merchant's 712 communication can be OBEX over IRDA, where OBEX is an object exchange, and particularly a set of high-level protocols allowing objects such as vCard contact information and vCalendar schedule entries to be exchanged using either infra-red (IRDA) or IROBEX or Bluetooth. Alternatively, the communication between merchant 712 and consumer 702 can be a short message service (SMS) or a combination of NFC and Bluetooth, or using a radio frequency identification (RFID). The financial application being conducted in the process flow of method 700 can exchange a customer invoice, or a consumer credit card for the transaction between merchant 712 and consumer 702.

Merchant 712 will communicate with the Internet 717 using a wireless internet HTTPS protocol. A payment gateway 708 in communication with Internet 716 will communicate the transaction with an acquirer 710. The acquirer 710 will communicate with transaction handler/payment processor 706. In turn, transaction handler/payment processor 706 will communicate with the issuer 706 to secure payment for the proximity payment. The payment gateway 708 will preferably be implemented through the transaction handler/payment processor 706. In method 700, consumer 702 can choose a default communication protocol for this proximity payment. Advantageously, no special hardware is required by merchant 712 to conduct the proximity payment illustrated in exemplary method 700. Moreover, merchant 712 can download a particular smart client, if needed, for participating in the financial transaction over the air through Internet 716.

Figure 8:
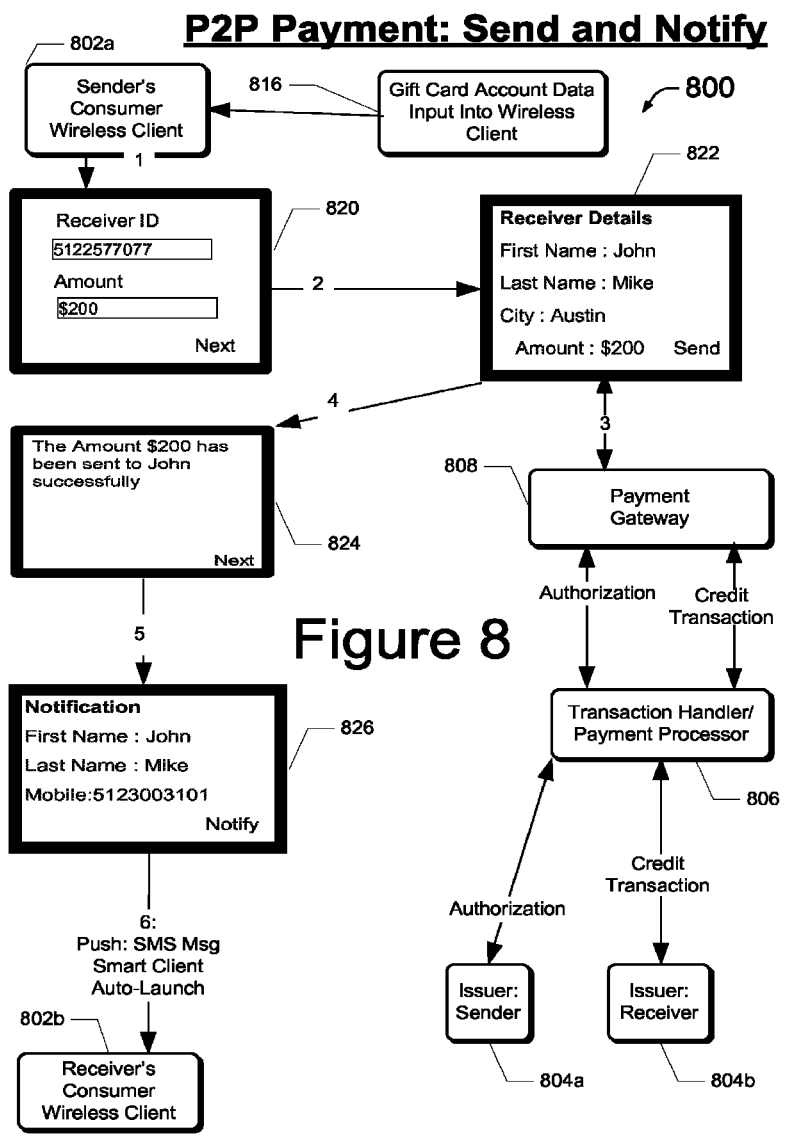
FIG. 8 is a flow chart illustrating an exemplary process flow for person-to-person money transfer services, where a wireless consumer electronics device, as in FIG. 6, having wireless communications functionality, is interactively used and by which a transferor may move money from the transferor's account to a transferee's account.

FIG. 8 depicts an interactive method 800 by which two consumers having respective wireless clients 802A, 802B can exchange funds from one account thereof to the account of the other. Stated otherwise, method 800 is a peer-to-peer or person-to-person money transfer service. Account data for an open loop gift card is input into a consumer wireless client 802a as shown at 816. This input can be via installation of a removable card into wireless client 802a so as to be read by same.

In method 800, a sender's consumer wireless client 802a interacts with a User Interface (UI) seen at reference number 820. In UI 820, a telephone number of a telephone or cellular phone corresponding to an account that is to receive funds is input into the field labeled as "Receiver ID". The amount of funds to be transferred, here $200, is entered into the next field. The user would then select the "Next" button on UI 820 in order to proceed along flow arrow #2 to the next UI 822. UI 822 provides the details of the person to whom $200 is to be transferred. As such, UI 822 shows that "John Mike" in the city of "Austin" is to receive the $200. If the operator of wireless client 802 agrees that the information presented in UI 822 is correct, then the operator activates the "Send" button and the cellular telephone then begins a dialogue through process flow #3 with a payment gateway 808. Payment gateway 808 secures an authorization through a transaction handler/payment processor 806 as well as communicates various financial transactions on accounts with transaction handler/payment processor 808.

Transaction handler/payment processor 806 communicates with the issuing bank of the consumer by sending a request to make a payment where that issuer bank is seen at reference numeral 804a. The particular communication between processor 806 and the issuing bank 804a is for authorization of a peer to peer payment or a person-to-person payment. Transaction handler/payment processor 806 communicates with the receiving bank who is the issuer for the consumer who is to receive funds and is seen at reference numeral 804b. In particular, transaction handler/payment processor 806 will credit the account of the consumer who is to receive funds via a credit transaction to issuer: Receiver 804b.

The issuer bank 804b communicates with the consumer wireless client 802b. In turn, the issuing bank 804a communicates with consumer wireless client 802a. As such, issuer 804a is the issuer of the account for the consumer that is operating the cell phone 802a, whereas the issuer 804b issues the account to the consumer who is operating cell phone 802b.

Once the operator of cellular telephone 802a confirms information received on UI 822 by operating the "Send" button, method 800 moves through process flow 3 for communication with payment gateway 808 as discussed above. Thereafter, method 800 moves through process flow #4 to UI 824. At UI 824, a confirmation is rendered on the cell phone 802a to the effect that "the amount $200 has been sent to John successfully." Following this diagnostic rendering on UI 824, the operator of cell phone 802a can operate the "Next" button on UI 824 to move method 800 through process flow #5 to UI 826. UI 826 provides a notification rendering to be displayed on cell phone 802b (the receiver's consumer wireless client). This rendering on UI 826 is "Notification: First Name: John, Last Name: Mike, Mobile: 512-003-101". If the cell phone 802a is to be used by the consumer to send this notification to the person who has received funds, then the operator of cell phone 802a will operate the "Notified" button UI 826. Thereafter, process flow #6 will be activated in method 800.

Process flow #6 in method 800 shows that there will be a 'push' text message (e.g.; SMS) via the smart client which will auto launch a rendering on the receiver's cell phone 802b. The rendering on cell phone 802b can be, for example, an audible phrase such as "You've Got Money!" Stated otherwise, the receiver's consumer wireless client 802b will have an auto launch rendering on the smart client application running on cell phone 802b which will allow the user of the cellular telephone to be notified of the arrival of under by audibly hearing the phrase "You've Got Money!" rendered by cell phone 802b.

Peer-to-Peer or Person-to-person payment seen in method 800 of FIG. 8 allows the payment gateway 808 to communicate with the bank that issued an account to the consumer who will be receiving funds, particularly issuer bank 804b which corresponds to the receiver's consumer wireless client 802b. The consumer having the account issued by issuer 804b can have their funds loaded instantly. This instantaneous loading of received funds from one account into another account can be accomplished through a web service that might use a protocol such as HTTPS\SOAP.

Figure 9:
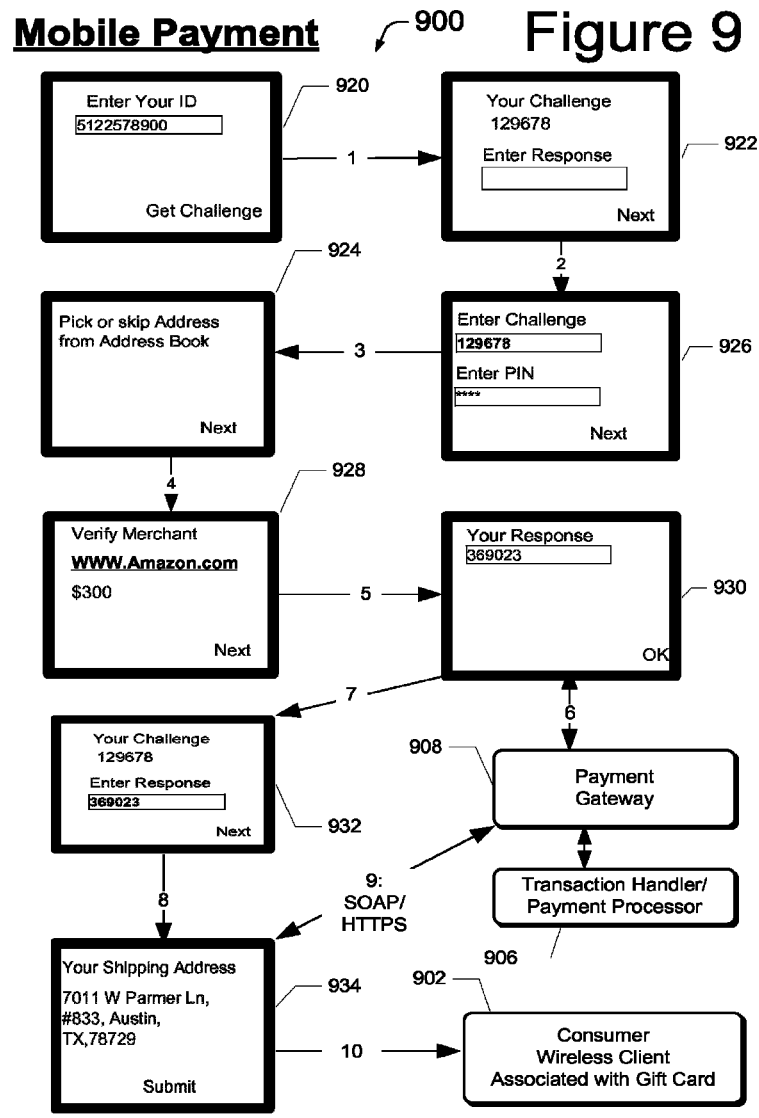
FIG. 9 is a flow chart depicting an exemplary method for a person to make a purchase from a merchant through its Internet e-commerce Web service in a cashless transaction by interactive use of a wireless consumer electronics device associated with an account of a gift card.

FIG. 9 shows an exemplary method 900 for making a purchase at an online e-commerce web service using a mobile wireless client 902. Before hand, account data for an open loop gift card is input into the mobile wireless client 902.

Method 900 illustrates a series of chronological user interface (UI) displays on consumer wireless client 902. A consumer operates wireless client 902 for each UI seen in method 900 in order to conduct a transaction with the online merchant through their web services e-commerce application. Method 900 begins with UI 920 in which a consumer enters a telephone number into a field on UI 920. In this case, the telephone number being entered is the phone number of the consumer wireless client 902. Thereafter, the consumer operates the button "Get Challenge" on UI 920 to move through process flow #1 to UI 922.

In UI 922, a challenge number is displayed on the display screen of UI 922. The consumer is expected to enter a response to the challenge in the open field seen in UI 922. The consumer uses the key pad of their cellular phone 902 to enter the response and then activates the "Next" button on UI 922.

Process flow number #2 in FIG. 9 takes method 900 to UI 926 at which a challenge number is entered by the consumer operating the consumer wireless client 902. Also, a personal identification number (PIN) is entered by the cell phone 902 on UI 926. Thereafter, the consumer operates the button "Next" in UI 926 to take method 900 on process flow #3 to UI 924.

UI 924 allows the consumer to pick a particular internet address of an e-commerce Website of an 'on-line' merchant with whom, and at which, a transaction is to be conducted. This step, for UI 924, however is optional, and the user moves from UI 926 by activating the button "Next" to move from UI 924 through process flow #4 to UI 928.

UI 928 shows a rendering on cell phone 902 that depicts the selected address that of the on-line merchant "www.Amazon.com", at which a purchase is sought in the amount of $300 from this merchant by the consumer operating cell phone 902. To confirm this transaction, and the amount thereof, with this merchant, the consumer activates the button "Next" on UI 928 to move method 900 through process flow #5 to UI 930.

At UI 930, the consumer enters a response to confirm that the purchase is to be completed or otherwise finalized. This purchase is then confirmed on UI 930 via a confirmation code seen in UI 930 as "369023" in a data entry field. To confirm this data entry, the consumer activates the button "OK" on UI 930.

Following the entry of the response code in the data entry field on UI 930, method 900 moves through process flow #6 to payment gateway 908. Payment gateway 908 interacts with transaction handler/payment processor 906 before method 900 proceeds to process flow #7.

After process flow #7, UI 932 is displayed on cell phone 902. UI 932 displays "Your Challenge" as "12962A". To this challenge, the consumer is expected to enter a response via a data entry field on UI 932. The entry made into the data entry field shown on UI 932 is "369023". To confirm this data entry on UI 932, the consumer operates the button "Next" to move through process flow #8 to UI 934. At UI 934, the consumer can select the shipping address to which the purchase made at the merchant "www.Amazon.com" is to be shipped. Here, UI 934 shows that the shipping address is "7011 W Parmer Ln, #833, Austin, Tex. 78729." If this shipping address displayed on UI 934 is correct, then the consumer selects the button "Submit" to move method 900 along process flow #10 which indicated the interaction with consumer wireless client 902. There is an interaction between UI 934 and payment gateway 908 as well as transaction handler/payment processor 906. The interaction between UI 934 of cell phone 902 and payment gateway 908 will preferably be in the protocol of SOAP/HTTPS as seen in process flow #9.

Following UI 934, process flow #10 signifies that the transaction has been authorized between the merchant and the consumer, the transaction is confirmed, and the amount of the transaction can be deducted from the account for the open loop gift card. As such, method 900 is an exemplary implementation of a consumer operating a cell phone to conduct an online purchase with an online merchant where the purchase is a non-cash transaction conducted upon an account.

Method 900 seen in FIG. 9 advantageously provides the on-line merchant with the benefit of a payment gateway that authenticates the consumer's cell phone, thus likely incurring low fraud liability or exposure from the transaction processor/handler 908 within the payment processing system. The consumer receives the benefit of a fast checkout when making such online purchases which speed is enabled by access to an address book for the merchant as well as for the consumer's shipping address. As can be seen in method 900, there is a two factor authentication including both the user's personal identification number (PIN) as well as the authentication through the mobile device operated by the consumer (see consumer wireless client 902). Optionally, method 900 can incorporate a digital signature using a cryptic graphic feature.

Figure 10:
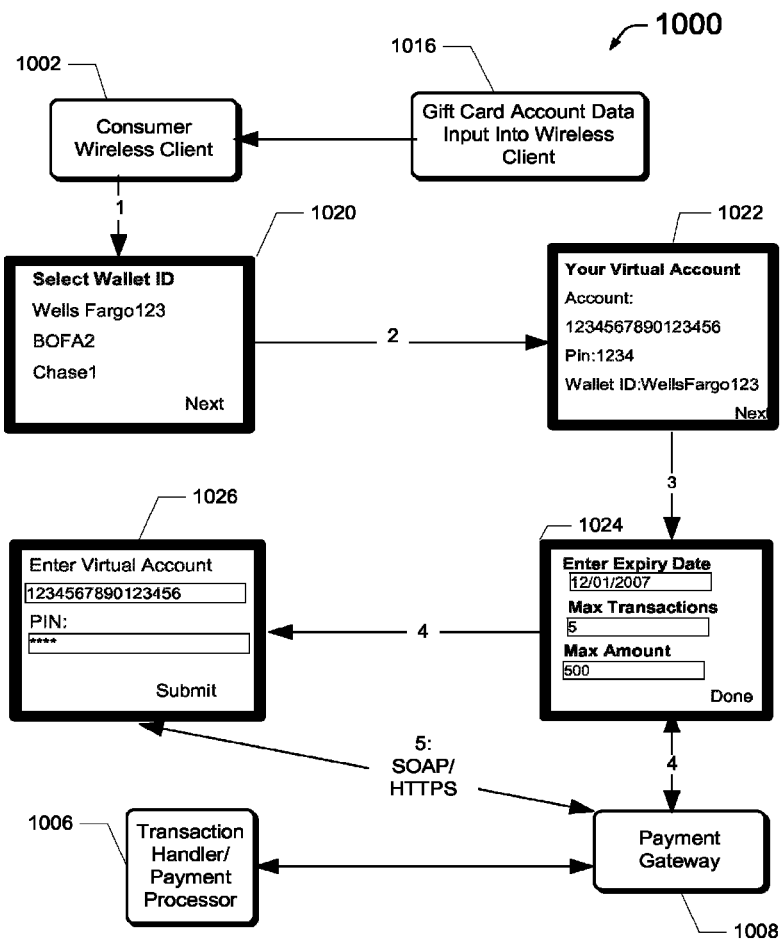
FIG. 10 is a flow chart depicting an exemplary method for a consumer to manage an account issued by an issuer to the consumer by interactive use of a wireless consumer electronics device, where the account is for a gift card.

FIG. 10 shows a method 1000 in which a consumer can operate a cell phone or other mobile communicator to manage their accounts issued to them by issuing banks. Account data for an open loop gift card is input into the cell phone as shown at 1016, such as by installing a removable open loop gift card in the cell phone so as to be read by same.

Seen from FIG. 10, a consumer wireless client 1002 moves through a process flow #1 of method 1000 to a user interface (UI) 1020. UI 1020 shows the display that permits the consumer operating cell phone 1002 to select one of three different accounts that are rendered on UI 1020. As seen in FIG. 10, UI 1020 shows the first account as being "Wells Fargo 123", the second account as being "BOFA2", and third account as being "Chase1". As those of ordinary skill in the relevant arts will understand, the three accounts listed on UI 1020 are identifiers known possibly only to the consumer for the particular accounts and the corresponding issuer thereof to the consumer.

The selection of the "Next" button on UI 1020 moves method 1000 through process flow #2 to US 1022. UI 1022 displays the relevant information about the account selected in UI 1020. As seen in FIG. 10, UI 1022 lists the virtual account number as being 1234567890123456, the corresponding PIN for that account being "1234", and the wallet ID being the selected count which is "Wells Fargo 123" as seen from the selections available in UI 1020. Following the visual confirmation to the consumer at UI 1022, consumer can operate the "Next" button on UI 1022 such that process 1000 moves along process flow #3 such that UI 1024 is displayed upon cell phone 1002. UI 1024 allows the consumer to enter three different data fields.

The first data field on UI 1024 is the date of expiration of transactions that are to be conducted on the selected account using the virtual account number. As seen in UI 1024, the first field data entry is Dec. 1, 2007. The second data entry field is the number of transactions that can be conducted between the present date and the expiration date on the selected account using the virtual account number. Here UI 1024 shows a maximum of five transactions have been entered by the consumer. The last field is the maximum amount of each transaction which is to be permitted on the selected account using the virtual account number. As seen in UT 1024, this amount is $500. Following the data entry of these different fields, the consumer activates button "Done" on UI 1026. Upon such activation, method 1000 moves along process flow #4 to display UI 1026 upon cell phone 1002.

UI 1026 permits the consumer to enter their virtual account number and a PIN previously displayed in UI 1022. Following the entry of these data into the two data entry field on UI 1026, the user operates button "Submit" to move method 1000 along process flow #5e seen in FIG. 10.

Process flow #5 seen in FIG. 10 involves interaction between the cell phone 1002 and a payment gateway 1008 of a transaction handler/payment processor 1006. The communication between cell phone 1002 and the payment gateway 1008 can use a variety of communication protocols. Preferably, the communication protocol will be "SOAP/HTTPS".

Method 1000 seen in FIG. 10 is advantageous in that an account can be managed by a consumer without ever having to give a credit card number to any merchant, be they a merchant contacted by the consumer online or contacted by the consumer by telephone. Moreover, a consumer can change the temporary virtual account number readily. Here, the virtual account number will be a number that temporarily corresponds to the actual account number that the consumer was issued by an issuer. The changes that can be made to the virtual account include the expiration date of that account, the number of the transactions that the consumer will permitted to be conducted by the consumer with that temporarily account number, the merchants that the consumer will not be permitted to transact with using that temporary account, etc. As such, the consumer can prevent many unauthorized uses of their real account with merchants, can prevent transactions having a currency amount above a consumer-set limit, can prevent transactions beyond a given date, beyond a given consumer-set number of transactions, as well as numerous other limitations and thresholds that are known to those of ordinary skill in the art though not necessarily seen in FIG. 10.

Figure 11:
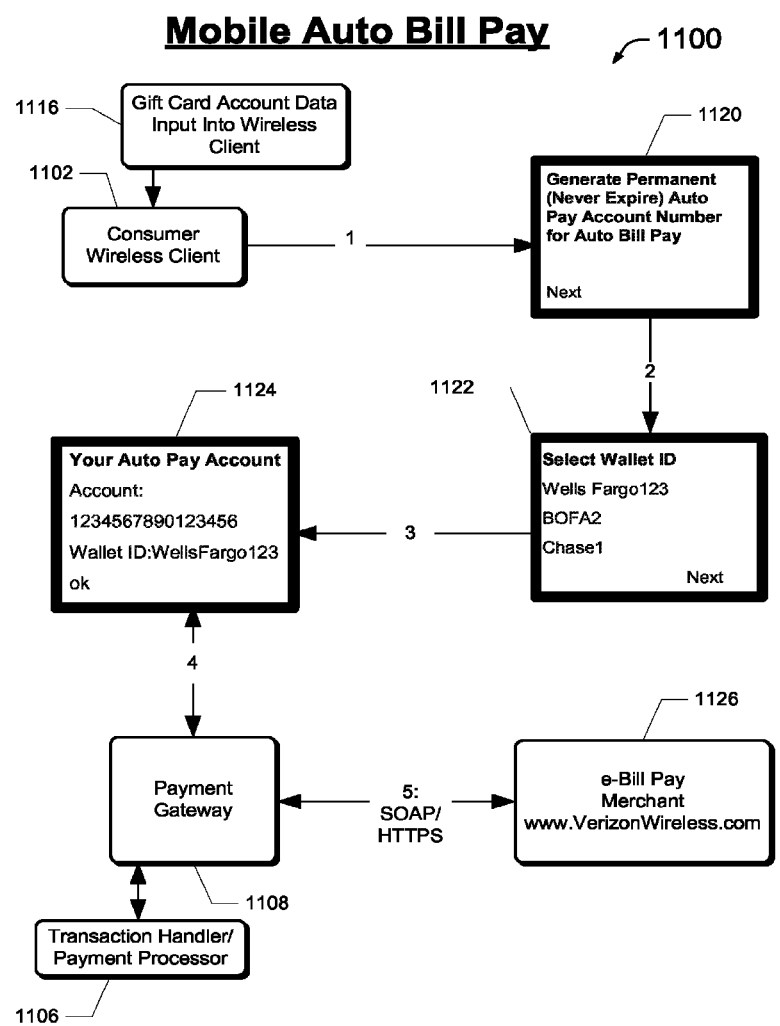
FIG. 11 is a flow chart illustrating an exemplary method for a consumer to arrange for automatic payments to be made to an account issued to the consumer by an issuer, where a mobile consumer electronics device having wireless communications functionality and being associated with an account of a gift card is interactively used by the consumer to make the arrangement.

FIG. 11 shows an exemplary method 1100 that allows a user to operate their cell phone to automatically pay bills after an initial set up. Account data for an open loop gift card is input into the cell phone 1102 as shown at 1116, such as by installation of a removable open loop gift card into cell phone 1102 so as to be read by same.

Consumer wireless client 1102 (e.g., cell phone) is operated by a consumer along process flow #1 such that the cell phone 1102 displays user interface 1120. UI 1120 displays the text "Generate permanent (never expire) automatic pay account number for auto bill pay" as a description of the function that is to be accomplished by the consumer using their cell phone 1102. If this is acceptable, then the consumer will activate the "Next" button on UI 1120. Upon such activation, method 1100 moves along process flow #2 to UI 1122. UI 1122 allows the consumer to select one of three different accounts, rendered by way of their respective identifiers, that the consumer wishes to use to indicate that a payment is to be made automatically to that account. Upon a selection of one of the three different account identifiers at UI 1122, the consumer activates the "Next" button. Upon such activation, method 1100 moves along process flow #3 to allow the cell phone 1102 to render UI 1124.

UI 1124 shows a confirmation of the particulars of the account selected by the consumer at UI 1122. The particular account depicted in UI 1124 is seen via the rendering of "Your auto pay account: account: 123456780123456; wallet id: Wells Fargo 123". As can be seen from UI 1234, the account identifier "Wells Fargo 123" was selected by the consumer at UI 1122. Following the selection of the account at UI 1122, and the confirmation of the selected account at UI 1124, then the user can activate the button "ok" on UI 1234. Upon such activation, method 1100 moves along process flow #4 for an interaction of cell phone 1102 with payment gateway 1108.

Payment gateway 1108 interacts with transaction handler/payment processor 1106 to facilitate the automatic payment transaction with the merchant desired by the consumer who operates cell phone 1102. Payment gateway 1108 communicates via the process flow #5 seen in FIG. 11 with a merchant 1126. In particular, merchant 1126 can be an electronic bill payment merchant who accepts electronic payment for amounts due on an account corresponding to the consumer that is operating consumer wireless client 1102. As seen in FIG. 11, the particular merchant that is to be automatically paid is "www.verizonwireless.com". Communication between merchant 1126 and payment gateway 1108 will preferably be in a communication protocol of "SOAP/HTTPS", which may be desirable for reason of security and integrity. As such, method 1100 allows a consumer to change their association between automatic bill payments and the real account number or debit account number that they are using to make such payments. Also, the consumer can get an alert ahead of time if the account number issued to them by an issuer that they intend to use to pay a bill is soon to expire. The consumer can also get alerts if there has been an error as to any automatic payment that they wish to make. After initial setup, payment gateway 1108 can periodically make automatic payments of amounts owed to merchant 1126 using the account designated by the consumer at UI 1122. As such, the consumer need not periodically attend to manual paying of bills as a periodic chore, but rather can allow payment gateway 1108 to automatically pay different merchants after the set up seen in method 1100.

Figure 12:
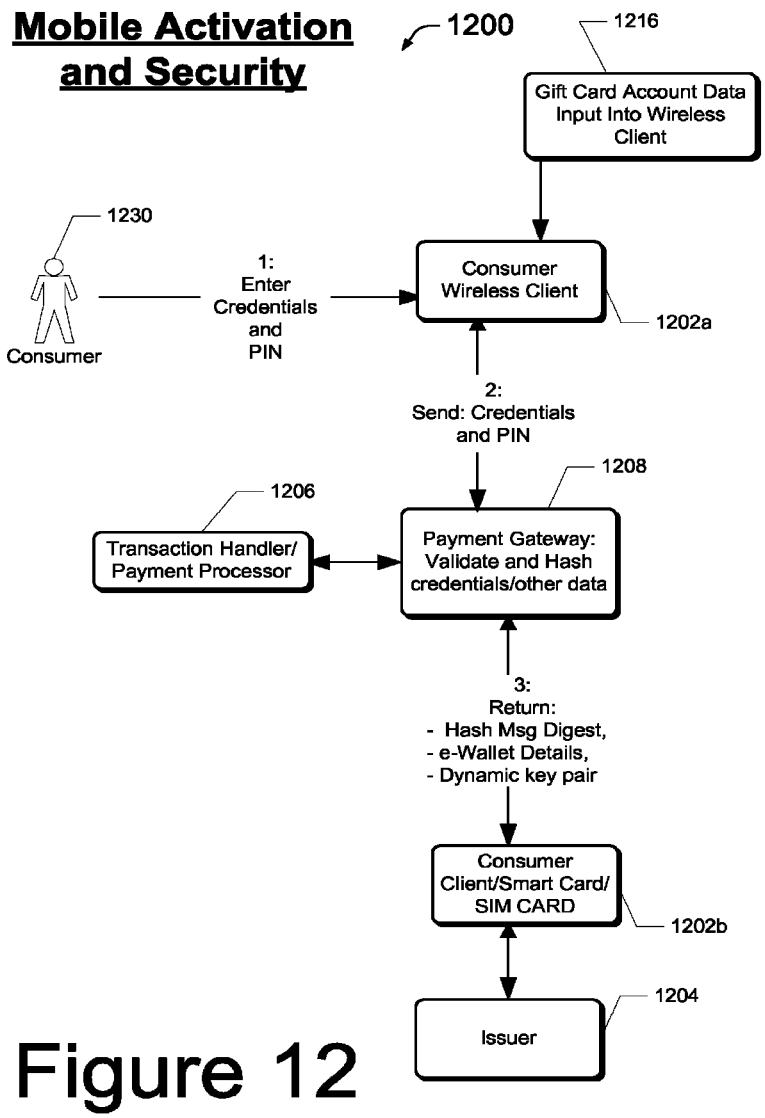
FIGS. 12-13 are flow charts depicting respective exemplary methods by which a consumer can have secure communications when conducting a financially-related transaction on an account of a gift card within a payment processing system using of a wireless consumer electronics device that is associated with the account.

FIG. 12 shows an exemplary method 1200 by which a cell phone or other portable mobile device for conducting transactions on an issued account can be activated securely. Other such mobile devices that may be activated may be a smart card or a SIM card. Account data for an open loop gift card is input into the cell phone 1202*a* as shown at 1216, such as by installing a removable card into cell phone 1202*a* so as to be read by same.

Method 1200 depicted in FIG. 12 begins when a consumer 1230 enters credentials and a personal information number (PIN) at process flow #1. These data are entered interactively with a mobile phone, such as consumer wireless client 1202*a*. Following the entry of the credentials and the PIN, process flow #2 proceeds to allow consumer wireless client 1202*a* to send the credentials and the PIN to a payment gateway 1208 seen in FIG. 12.

Payment gateway 1208 validates the credentials and the PIN and then hashes or otherwise obscures these data including the credentials and any other data. Payment gateway 1208 also interacts with transaction handler/payment processor 1206. Following the obscuring or hashing of the credentials and other data, process flow #3 seen in FIG. 12 returns a hashed message digest from electronic wallet details and a dynamic key pair to the consumer wireless client 1202*b* seen in FIG. 12. The wireless client 1202*a* may be different than the mobile device 1202*b*, such as when the mobile device 1202*b* is a smart card, or a SIM card and mobile device 1202*a* is a cell phone. Alternatively, the activated mobile device 1202*a* may be the same as the activated mobile device 1202*b*. Following the receipt of the hashed message digest, the electronic wallet details, and a dynamic key pair by consumer mobile device 1202B, method 1200 proceeds through process flow #4 to interact with an issuer 1204 who issued the account number to the consumer 1230.

As can be seen from FIG. 12, payment gateway 1208 is able to validate the credentials received from consumer wireless client 1202*a* so that they can be obscured through a hashing algorithm. As such, the consumer to whom the account has been issued by an issuer can avoid violation of privacy by insuring that no such private information is stored on their cell phone, SIM card or smart card. For instance, the PIN entered at process flow #2 need not be stored on the mobile device. As such, if a mobile device, such as a cell phone, is stolen from the consumer, private information about accounts, access codes, and other such credentials can not be reversed engineered or otherwise removed from the mobile device because that information is not stored on the mobile device. Rather, any such information has been obscured by a hashing algorithm performed in conjunction with payment gateway 1208 and/or transaction handler/payment processor 1206.

Figure 13:
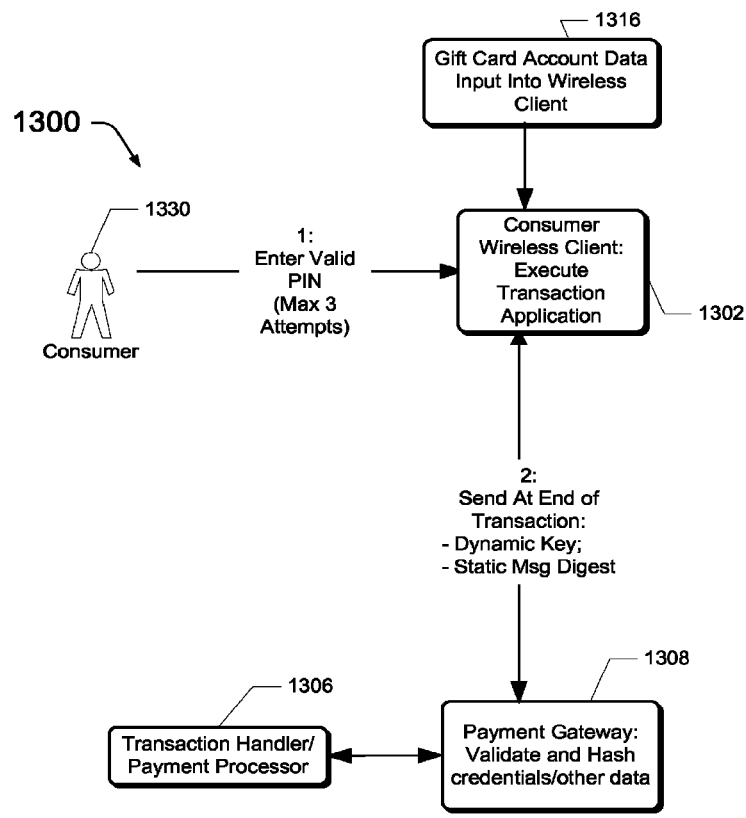

FIG. 13 shows an exemplary method 1300 that allows the authentication of a mobile device to interact in a payment processing system. Account data for an open loop gift card is input into the cell phone 1302 as shown at 1316, such as by installing a removable card into cell phone 1302 so as to be read by same.

Method 1300 begins with a consumer 1330 entering a valid PIN into a consumer wireless client 1302. By way of example, client 1302 can be a cell phone. As such, cell phone 1302 executes a transaction application that allows consumer 1320 to make a maximum of three tries to enter a valid personal information number (PIN). If the consumer 1330 has exceeded the number of tries to enter a valid PIN, then the cell phone 1302 is prohibited from further attempts by consumer 1303 to authenticate the cell phone for use in conducting transactions.

If consumer 1330 enters a valid PIN in process flow #1 into cell phone 1302, then method 1300 proceeds through process flow #2 to interact with a payment gateway 1308. Subsequent to the conducting of a transaction between a consumer and a merchant, or other such transactions upon an account issued to the consumer, a dynamic key and a static message digest is sent back to cell phone 1302 through process flow #2. The dynamic key and static message digest are sent from payment gateway 1308 back to cell phone 1302. The dynamic key and static message digest are derived by payment gateway 1308 by interaction with transaction handler/payment processor 1306. The security inherent in making sure the dynamic key and static message are sent to cell phone 1302 at the end of every transaction conducted by consumer 1330 ensures proper authentication, safety and security of financial transactions. With these are lower probabilities of fraudulent transactions conducted with cell phone 1302. Stated otherwise, the consumer is not permitted to use the cell phone 1302 to conduct a transaction unless the consumer enter the proper PIN, and the consumer will be prohibited from such transactions if they can not enter the valid PIN after a maximum number of tries, for instance three attempts as are seen in FIG. 13.

The Payment Processing System

FIG. 14 illustrates a block diagram of an exemplary payment processing system 1400 within which the exemplary methods and process of FIGS. 1-3 may be practiced. As will be readily understood by persons of ordinary skill in payment processing systems, a transaction such as a payment transaction in a payment processing system can include participation from different entities that are each a component of the payment processing system. The exemplary payment processing system 1400 includes an issuer 1404 such as the issuer; a transaction handler 1406, such as the transaction handler; an acquirer 1408 such as the acquirer; a merchant 1410 such as the merchant; and a consumer 1402 such as the consenting consumer. The acquirer 1408 and the issuer 1404 can communicate through the transaction handler 1406. The merchant 1410, such as the utility provider, may utilize at least one POS that can communicate with the acquirer 1408, the transaction handler 1406, or the issuer 1404. Thus, the POS is in operative communication with the payment processing system 1400.

Typically, a transaction begins with the consumer 1402 presenting an account number of an account (e.g., non-credit account) such as through the use of a computer terminal or a portable consumer device 1412 to the merchant 1410 to initiate an exchange for a good or service. The consumer 1402 may be an individual or a corporate entity. The consumer 1402 may be an account holder of the account issued by the issuer 1404 such as a joint account holder of the account or a person having access to the account such as an employee of a corporate entity having access to a corporate account. The portable consumer device 1412 may include a payment card, a gift card, a smartcard, a smart media, a payroll card, a health care card, a wrist band, a machine readable medium containing account information, a keychain device such as the SPEEDPASS® commercially available from ExxonMobil Corporation or a supermarket discount card, a cellular phone, personal digital assistant, a pager, a security card, a computer, an access card, a wireless terminal, or a transponder. The portable consumer device 1412 may include a volatile or a non-volatile memory to store information such as the account number or a name of the account holder.

The merchant 1410 may use an acceptance point device, such as a POS, to obtain account information, such as the indicator for the account (e.g., the account number of the account), from the portable consumer device 1412. The portable consumer device 1412 may interface with the POS using a mechanism including any suitable electrical, magnetic, or optical interfacing system such as a contactless system using radio frequency, a magnetic field recognition system, or a contact system such as a magnetic stripe reader. The POS sends a transaction authorization request to the issuer 1404 of the portable consumer device 1412. Alternatively, or in combination, the portable consumer device 1412 may communicate with the issuer 1404, the transaction handler 1406, or the acquirer 1408.

The issuer 1404 may submit an authorize response for the transaction via the transaction handler 1406. Authorization includes the issuer 1404, or the transaction handler 1406 on behalf of the issuer 1404, authorizing the transaction in connection with instructions of the issuer 1404, such as through the use of business rules. The transaction handler 1406 may maintain a log or history of authorized transactions. Once approved, the merchant 1410 can record the authorization and allow the consumer 1402 to receive the good or service.

The merchant 1410 may, at discrete periods, such as the end of the day, submit a list of authorized transactions to the acquirer 1408 or other components of the payment processing system 1400 for clearing and settling. The transaction handler 1406 may compare the submitted authorized transaction list with its own log of authorized transactions. If a match is found, the transaction handler 1406 may route the clearing and settling request from the corresponding acquirer 1408 to the corresponding issuer 1404 involved in each transaction. Once the acquirer 1408 receives the payment of the transaction from the issuer 1404, it can forward the payment to the merchant 1410 less any transaction costs, such as fees. If the transaction involves a debit or pre-paid card, the acquirer 1408 may choose not to wait for the initial payment prior to paying the merchant 1410.

There may be intermittent steps in the foregoing process, some of which may occur simultaneously. For example, the acquirer 1408 can initiate the clearing and settling process, which can result in payment to the acquirer 1408 for the amount of the transaction. The acquirer 1408 may request from the transaction handler 1406 that the transaction be cleared and settled.

It should be understood implementations can be in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A processor-implemented method for conducting virtual account transactions, comprising:
    reading, via a card reader, account information of a data bearing card;
    receiving, from a user, at least one selection of a payment account identifier corresponding to the account information of the data bearing card;
    receiving at least one consumer-specified custom transaction limiting parameter;
    generating via a processor a virtual account identifier;
    temporarily associating the user selected payment account identifier with the generated virtual account identifier; and
    conducting a payment transaction that matches the at least one consumer-specified custom transaction limiting parameter using the generated virtual account identifier.

2. The method of claim 1, wherein the at least one consumer-specified custom transaction limiting parameter is an expiration date for the virtual account identifier.

3. The method of claim 1, wherein the at least one consumer-specified custom transaction limiting parameter is a maximum number of transactions allowed using the virtual account identifier.

4. The method of claim 1, wherein the at least one consumer-specified custom transaction limiting parameter is a maximum amount allowed for each transaction using the virtual account identifier.

5. The method of claim 1, further comprising obtaining a personal identification number (PIN) for the virtual account identifier.

6. The method of claim 1, wherein the payment transaction is a recurring auto bill pay transaction.

7. The method of claim 1, wherein the at least one consumer-specified custom transaction limiting parameter specifies merchants that are not permitted to enter into a payment transaction using the generated virtual account identifier.

8. The method of claim 1, further comprising:
providing the virtual account identifier and the associated user selected payment account identifier a payment gateway.

9. The method of claim 1, wherein conducting the payment transaction further comprises:
receiving an authorization request from a merchant for the payment transaction using the generated virtual account identifier;
evaluating the payment transaction using the at least one customer transaction parameter; and
obtaining an authorization response approving or declining the payment transaction based on said evaluating.

10. The method of claim 1, wherein the payment transaction is conducted using a wireless mobile communication device.

11. The method of claim 1, wherein the user selected payment account identifier corresponds to a gift card account that is read by a wireless mobile communication device.

12. The method of claim 1, wherein the card reader includes an NFC capable device integrated into a mobile device equipped with the card reader.

13. A wireless mobile communication apparatus for conducting virtual account transactions, comprising:
a memory;
a processor disposed in communication with said memory, and configured to issue a plurality of processing instructions stored in the memory, wherein the processor issues instructions to:
read, via a card reader, account information of a data bearing card;
receive, from a user, at least one selection of a payment account identifier corresponding to the account information of the data bearing card;
receive at least one consumer-specified custom transaction limiting parameter;
generate via a processor a virtual account identifier;
temporarily associate the user selected payment account identifier with the generated virtual account identifier; and
conduct a payment transaction that matches the at least one consumer-specified custom transaction limiting parameter using the generated virtual account identifier.

14. The apparatus of claim 13, wherein the instructions to conduct the payment transaction further comprises instructions to:
receive an authorization request from a merchant for the payment transaction using the generated virtual account identifier;
evaluate the payment transaction using the at least one customer transaction parameter; and
obtain an authorization response approving or declining the payment transaction based on said evaluation.

15. The apparatus of claim 13, wherein the card reader includes an NFC capable device integrated into the wireless mobile communication apparatus equipped with the card reader.

16. The wireless mobile communication apparatus of claim 13, wherein the apparatus is configured for a communication protocol including Near Field Communications (NFC), Bluetooth, Wi-Fi, IrDA, and a combination thereof.

17. A processor-readable non-transitory medium storing processor-issuable instructions to:
read, via a card reader, account information of a data bearing card;
receive, from a user, at least one selection of a payment account identifier corresponding to the account information of the data bearing card;
receive at least one consumer-specified custom transaction limiting parameter;
generate a virtual account identifier;
temporarily associate the user selected payment account identifier with the generated virtual account identifier; and
conduct a payment transaction that matches the at least one consumer-specified custom transaction limiting parameter using the generated virtual account identifier.

18. The medium of claim 17, wherein the instructions to conduct the payment transaction further comprises instructions to:
receive an authorization request from a merchant for the payment transaction using the generated virtual account identifier;
evaluate the payment transaction using the at least one customer transaction parameter; and
obtain an authorization response approving or declining the payment transaction based on said evaluation.

19. The medium of claim 17, wherein the card reader includes an NFC capable device integrated into a mobile device equipped with the card reader.

20. A wireless mobile communication system for conducting virtual account transactions, comprising means to:
read, via a card reader, account information of a data bearing card;
receive, from a user, at least one selection of a payment account identifier corresponding to the account information of the data bearing card;
receive at least one consumer-specified custom transaction limiting parameter;
generate a virtual account identifier;
temporarily associate the user selected payment account identifier with the generated virtual account identifier; and
conduct a payment transaction that matches the at least one consumer-specified custom transaction limiting parameter using the generated virtual account identifier.

21. The system of claim 20, wherein the means to conduct the payment transaction further comprises means to:
receive an authorization request from a merchant for the payment transaction using the generated virtual account identifier;
evaluate the payment transaction using the at least one customer transaction parameter; and
obtain an authorization response approving or declining the payment transaction based on said evaluation.

22. The system of claim 20, wherein the card reader includes an NFC capable device integrated into a mobile device equipped with the card reader.

* * * * *